United States Patent
Hajibeygi et al.

(10) Patent No.: US 8,301,429 B2
(45) Date of Patent: Oct. 30, 2012

(54) ITERATIVE MULTI-SCALE METHOD FOR FLOW IN POROUS MEDIA

(75) Inventors: Hadi Hajibeygi, Zurich (CH); Giuseppe Bonfigli, St. Gallen (CH); Marc Andre Hesse, Austin, TX (US); Patrick Jenny, Weesen (CH)

(73) Assignees: Chevron U.S.A. Inc., San Ramon, CA (US); Schlumberger Technology Corporation, Houston, TX (US); ETH Zurich, Zurich (CH)

( * ) Notice: Subject to any disclaimer, the term of this patent is extended or adjusted under 35 U.S.C. 154(b) by 232 days.

(21) Appl. No.: 12/575,970

(22) Filed: Oct. 8, 2009

(65) Prior Publication Data
US 2010/0094605 A1  Apr. 15, 2010

Related U.S. Application Data

(60) Provisional application No. 61/104,154, filed on Oct. 9, 2008.

(51) Int. Cl.
G06G 7/48 (2006.01)
G01B 3/00 (2006.01)
G01D 18/00 (2006.01)
G01D 1/00 (2006.01)

(52) U.S. Cl. ............... 703/10; 702/33; 702/85; 702/127

(58) Field of Classification Search ............ 703/10, 703/9; 702/5, 33, 85, 127; 367/23, 57
See application file for complete search history.

(56) References Cited

U.S. PATENT DOCUMENTS

| | | | |
|---|---|---|---|
| 4,821,164 A | 4/1989 | Swanson | |
| 5,321,612 A | 6/1994 | Stewart | |
| 5,663,928 A | 9/1997 | De Bazelaire et al. | |
| 5,729,451 A | 3/1998 | Gibbs et al. | |
| 5,923,329 A | 7/1999 | Beale | |
| 6,018,497 A | 1/2000 | Gunasekera | |
| 6,078,869 A | 6/2000 | Gunasekera | |
| 6,106,561 A | 8/2000 | Farmer | |
| 6,185,512 B1 | 2/2001 | Lambrecht | |

(Continued)

FOREIGN PATENT DOCUMENTS

WO    WO99/52048    10/1999

(Continued)

OTHER PUBLICATIONS

International Preliminary Report on Patentability, PCT/US2009/060044, Apr. 21, 2011.

(Continued)

*Primary Examiner* — Kamini S Shah
*Assistant Examiner* — Akash Saxena
(74) *Attorney, Agent, or Firm* — Craig R. Vander Ploeg; Christopher D. Northcutt

(57) ABSTRACT

Computer-implemented iterative multi-scale methods and systems are provided for handling simulation of complex, highly anisotropic, heterogeneous domains. A system and method can be configured to achieve simulation of structures where accurate localization assumptions do not exist. The iterative system and method smoothes the solution field by applying line relaxation in all spatial directions. The smoother is unconditionally stable and leads to sets of tri-diagonal linear systems that can be solved efficiently, such as by the Thomas algorithm. Furthermore, the iterative smoothing procedure, for the improvement of the localization assumptions, does not need to be applied in every time step of the computation.

22 Claims, 29 Drawing Sheets

U.S. PATENT DOCUMENTS

| | | | |
|---|---|---|---|
| 6,266,619 B1 | 7/2001 | Thomas et al. | |
| 6,631,202 B2 | 10/2003 | Hale | |
| 6,662,109 B2 | 12/2003 | Roggero et al. | |
| 6,721,694 B1 | 4/2004 | Lambrecht et al. | |
| 6,766,255 B2 | 7/2004 | Stone | |
| 6,826,520 B1 | 11/2004 | Khan et al. | |
| 7,480,206 B2 | 1/2009 | Hill | |
| 7,516,056 B2 * | 4/2009 | Wallis et al. | 703/10 |
| 7,684,967 B2 * | 3/2010 | Wallis et al. | 703/10 |
| 7,765,091 B2 * | 7/2010 | Lee et al. | 703/10 |
| 7,983,883 B2 * | 7/2011 | Chen et al. | 703/6 |
| 2002/0013687 A1 | 1/2002 | Ortoleva | |
| 2005/0177354 A1 | 8/2005 | Jenny et al. | |
| 2005/0203725 A1 * | 9/2005 | Jenny et al. | 703/10 |
| 2005/0273303 A1 | 12/2005 | Flandrin et al. | |
| 2006/0031794 A1 * | 2/2006 | Li et al. | 703/2 |
| 2006/0235666 A1 * | 10/2006 | Assa et al. | 703/10 |
| 2006/0265204 A1 * | 11/2006 | Wallis et al. | 703/10 |
| 2006/0277012 A1 | 12/2006 | Ricard et al. | |
| 2007/0198192 A1 * | 8/2007 | Hsu et al. | 702/6 |
| 2008/0167849 A1 * | 7/2008 | Hales et al. | 703/10 |
| 2008/0183451 A1 * | 7/2008 | Weng et al. | 703/10 |
| 2008/0195358 A1 * | 8/2008 | El Ouair et al. | 703/2 |
| 2008/0208539 A1 * | 8/2008 | Lee et al. | 703/1 |
| 2009/0030858 A1 * | 1/2009 | Hegeman et al. | 706/17 |
| 2009/0125288 A1 * | 5/2009 | Main et al. | 703/10 |
| 2009/0138245 A1 * | 5/2009 | Appleyard | 703/2 |
| 2009/0164186 A1 * | 6/2009 | Haase et al. | 703/10 |
| 2009/0165548 A1 * | 7/2009 | Pop et al. | 73/152.51 |
| 2009/0216505 A1 * | 8/2009 | Sarma et al. | 703/2 |
| 2009/0306947 A1 * | 12/2009 | Davidson | 703/2 |
| 2009/0319242 A1 * | 12/2009 | Lee et al. | 703/10 |
| 2010/0004908 A1 * | 1/2010 | Lunati | 703/2 |
| 2010/0057413 A1 * | 3/2010 | Lee et al. | 703/2 |
| 2010/0094605 A1 * | 4/2010 | Hajibeygi et al. | 703/2 |
| 2010/0114544 A1 * | 5/2010 | Dogru | 703/10 |
| 2010/0149917 A1 * | 6/2010 | Imhof et al. | 367/53 |
| 2010/0211536 A1 * | 8/2010 | Al-Fattah | 706/21 |
| 2010/0225647 A1 * | 9/2010 | Flew et al. | 345/420 |
| 2010/0241410 A1 * | 9/2010 | McElhinney et al. | 703/10 |
| 2010/0286967 A1 * | 11/2010 | Vasilevskiy et al. | 703/2 |

FOREIGN PATENT DOCUMENTS

| | | |
|---|---|---|
| WO | WO99/57418 | 11/1999 |
| WO | WO00/79423 | 12/2000 |
| WO | WO01/06091 | 1/2001 |
| WO | WO01/27755 | 4/2001 |
| WO | WO01/27858 | 4/2001 |
| WO | WO02/06857 | 1/2002 |

OTHER PUBLICATIONS

Hadi Hajibeyge et al., "Iterative multiscale finite-volume method," Journal of Computational Physics,: Oct. 1, 2008, vol. 227, Issue 19, pp. 8604-8621.

PCT International Search Report and Written Opinion dated May 19, 2010 (6 pages).

Aarnes, J. E., Kippe, V., and Lie, K.A., Mixed Multiscale Finite Elements and Streamline Methods for Reservoir Simulation of Large Geomodels, Advances in Water Resources, Mar. 2005, pp. 257-271, vol. 28, Issue 3, Elsevier Ltd.

Arbogast, T., Numerical Subgrid Upscaling of Two-Phase Flow in Porous Media, Numerical Treatment of Multiphase Flows in Porous Media, Lecture Notes in Physics, 2000, vol. 552, pp. 35-49, Springer Berlin / Heidelberg.

Arbogast, T. and Bryant, S.L., Numerical Subgrid Upscaling for Waterflood Simulations, SPE Reservoir Simulation Symposium, Feb. 11-14, 2001, pp. 1-14, Paper No. 66375-MS, Society of Petroleum Engineers Inc., Houston, Texas.

Bratvedt, F., Gimse, T., and Tegnander, C., Streamline Computations for Porous Media Flow Including Gravity, Transport in Porous Media, Oct. 1996, pp. 63-78, vol. 25, No. 1, Springer Netherlands.

Busigin, A. and Phillip, C.R., Efficient Newton-Raphson and Implicit Euler Methods for Solving The HNC Equation, Molecular Physics, 1992, pp. 89-101, vol. 76 Issue 1, Taylor & Francis, London.

Chen, Z. and Hou, T.Y., A Mixed Multiscale Finite Element Method for Elliptic Problems With Oscillating Coefficients, Mathematics of Computation, 2002, pp. 541-576, vol. 72, American Mathematical Society.

Chien, M.C.H., Wasserman, M.L., Yardumian, H.E., Chung, E.Y., Nguyen, T,, and Larson, J., The Use of Vectorization and Parallel Processing for Reservoir Simulation, SPE Reservoir Simulation Symposium, Feb. 1-4, 1987, pp. 329-341, Paper No. 16025-MS, Society of Petroleum Engineers Inc., San Antonio, Texas.

Christie, M.A. and Blunt, M.J., Tenth SPE Comparative Solution Project: A Comparison of Upscaling Techniques, SPE Reservoir Simulation Symposium, Feb. 11-14, 2001, pp. 1-13, Paper No. 66599, Society of Petroleum Engineers Inc., Houston, Texas.

Durlofsky, L.J., Numerical Calculation of Equivalent Grid Block Permeability Tensors for Heterogeneous Porous Media, Water Resources Research, May 1991, pp. 699-708, vol. 27, No. 5, American Geophysical Union.

Durlofsky, L.J., A Triangle Based Mixed Finite Element-Finite Volume Technique for Modeling Two Phase Flow Through Porous Media, Journal of Computational Physics, Apr. 1993, pp. 252-266, vol. 105, Issue 2; Academic Press, Inc.

Durlofsky, L.J., Jones, R.C., and Milliken, W.J., A Nonuniform Coarsening Approach for the Scale-Up of Displacement Processes in Heterogeneous Porous Media, Advances in Water Resources, Oct.- Dec. 1997, pp. 335-347, vol. 20, Issues 5-6, Elsevier Science Ltd.

Efendiev, Y.R., Hou, T.Y., and Wu, X.H., Convergence of a Nonconforming Multiscale Finite Element Method, SIAM Journal of Numerical Analysis, 2000, pp. 888-910, vol. 37, No. 3, Society for Industrial and Applied Mathematics.

Efendiev, Y.R. and Wu, X.H., Multiscale Finite Element for Problems With Highly Oscillatory Coefficients, Numerische Mathematik, Jan. 2002, pp. 459-486, vol. 90, No. 3, Springer Berlin / Heidelberg.

Fujiwara, K., Okamoto, Y., Kameari, A., Ahagon, A., The Newton-Raphson Method Accelerated by Using a Line Search-Comparison Between Energy Functional and Residual Minimization, IEEE Transactions on Magnetics, May 2005, pp. 1724-1727, vol. 41, No. 5, Institute of Electrical and Electronics Engineers, Inc. (IEEE).

Hou, T.Y. and Wu, X.H., A Multiscale Finite Element Method for Elliptic Problems in Composite Materials and Porous Media, Journal of Computational Physics, 1997, pp. 169-189, vol. 134, Academic Press.

Jenny, P., Wolfsteiner, C., Lee, S.H., and Durlofsky, L.J., Modeling Flow in Geometrically Complex Reservoirs Using Hexahedral Multi-Block Grids, SPE Reservoir Simulation Symposium, Feb. 11-14, 2001, pp. 1-10, Paper No. 66357, Society of Petroleum Engineers Inc., Houston, Texas.

Jenny, P., Lee, S. H., Tchelepi, H. A., Adaptive Multiscale Finite-Volume Method for Multiphase Flow and Transport in Porous Media, Sep. 24, 2004, Multiscale Modeling and Simulation, vol. 3, No. 1, pp. 50-64, Society for Industrial and Applied Mathematics.

Lee, S.H., Durlofsky, L.J., Lough, M.F., and Chen, W.H., Finite Difference Simulation of Geologically Complex Reservoirs With Tensor Permeabilities, SPE Reservoir Evaluation & Engineering, Dec. 1998, pp. 567-574, Society of Petroleum Engineers Inc.

Lee, S.H., Tchelepi, H., and Dechant, L.F., Implementation of a Flux-Continuous Finite Difference Method for Stratigraphic, Hexahedron Grids, SPE Reservoir Simulation Symposium, Feb. 14-17, 1999, pp. 1-11, Paper No. 51901, Society of Petroleum Engineers Inc., Houston, Texas.

Lunati, I. and Jenny, P., Multiscale Finite-Volume Method for Compressible Multiphase Flow in Porous Media, Journal of Computational Physics, Aug. 10, 2006, pp. 616-636, vol. 216, Issue 2, Elsevier Inc.

Oak, M.J., Baker, L.E., and Thomas, D.C., Three-Phase Relative Permeability of Berea Sandstone, Journal of Petroleum Technology (JPT), Aug. 1990, pp. 1054- 1061, vol. 42, No. 8, Society of Petroleum Engineers.

Salibian-Barrera, M., Fast and Stable Bootstrap Methods for Robust Estimates, Interface Foundation Annual Meeting, 2002, pp. 1-14, Montreal, QC.

Shi, G. And Liu, X., Multi-Parameter Accelerated Modified Newton—Raphson Methods for Rigid-Plastic FE Analysis, Acta Mechanica Solida Sinica, Dec. 2002, pp. 323-331, vol. 15, No. 4, DOI 10.1007/BF02493033, The Chinese Society of Theoretical and Applied Mechanics, Beijing, China.

Tesch, J., The Newton-Raphson Method and Its Application to Fixed Points, Nov. 21, 2005, Center for Hybrid and Embedded Software Systems at the University of California, Berkeley, Berkeley, California.

Wallstrom, T.C., Hou, S., Christie, M.A., Durlofsky, L.J. and Sharp, D.H., Application of a New Two-Phase Upscaling Technique to Realistic Reservoir Cross Sections, SPE Reservoir Simulation Symposium, Feb. 14-17, 1999, pp. 451-462, Paper No. 51939, Society of Petroleum Engineers Inc., Houston, Texas.

Hadi Hajibeyge et al., Iterative Multiscale Finite-Volume Method, Journal of Computational Physics, Jun. 2008, vol. 227, Issue 19, pp. 8604-8621.

Ivan Lunati, Patrick Jenny, The Multiscale Finite-Volume Method: A flexible tool to model physically complex flow in porous media, In: $10^{th}$ European Conference on the Mathematics of Oil Recover—Amsterdam. The Netherland, Sep. 2006.

Vegard Kippe et al., A Comparison of Multiscale Methods for Elliptics Problems in Porous Media Flow, Computational Geosciences, Feb. 2008, vol. 12, No. 3, pp. 377-398, ISSN 1420-0597 (print) 1573-1499 (online).

* cited by examiner

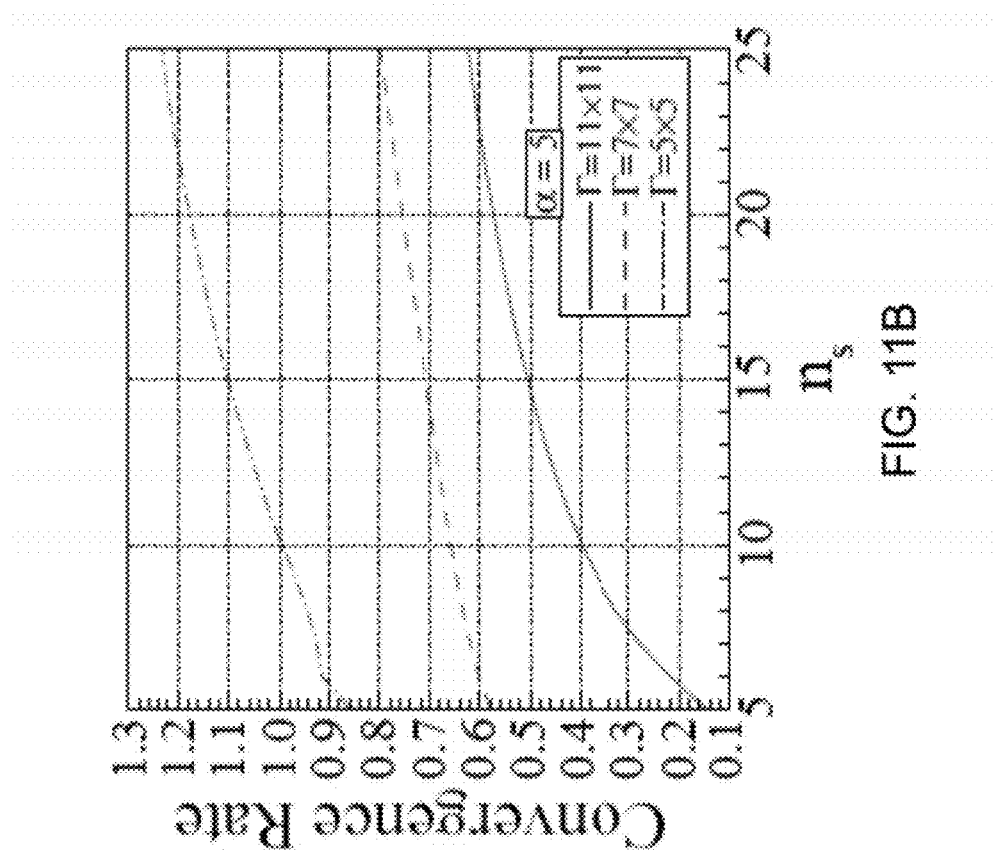
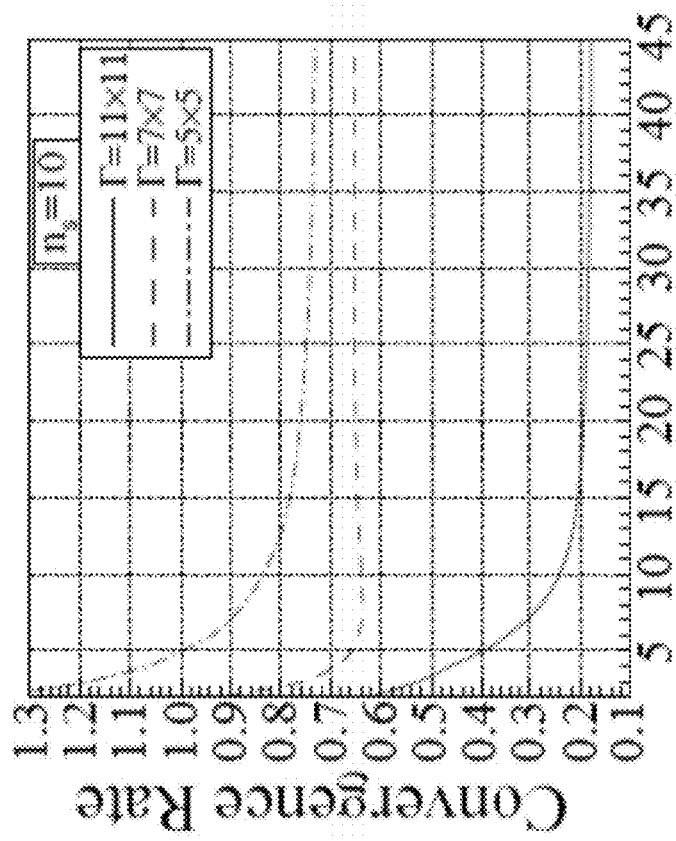
FIG. 11B
FIG. 11A

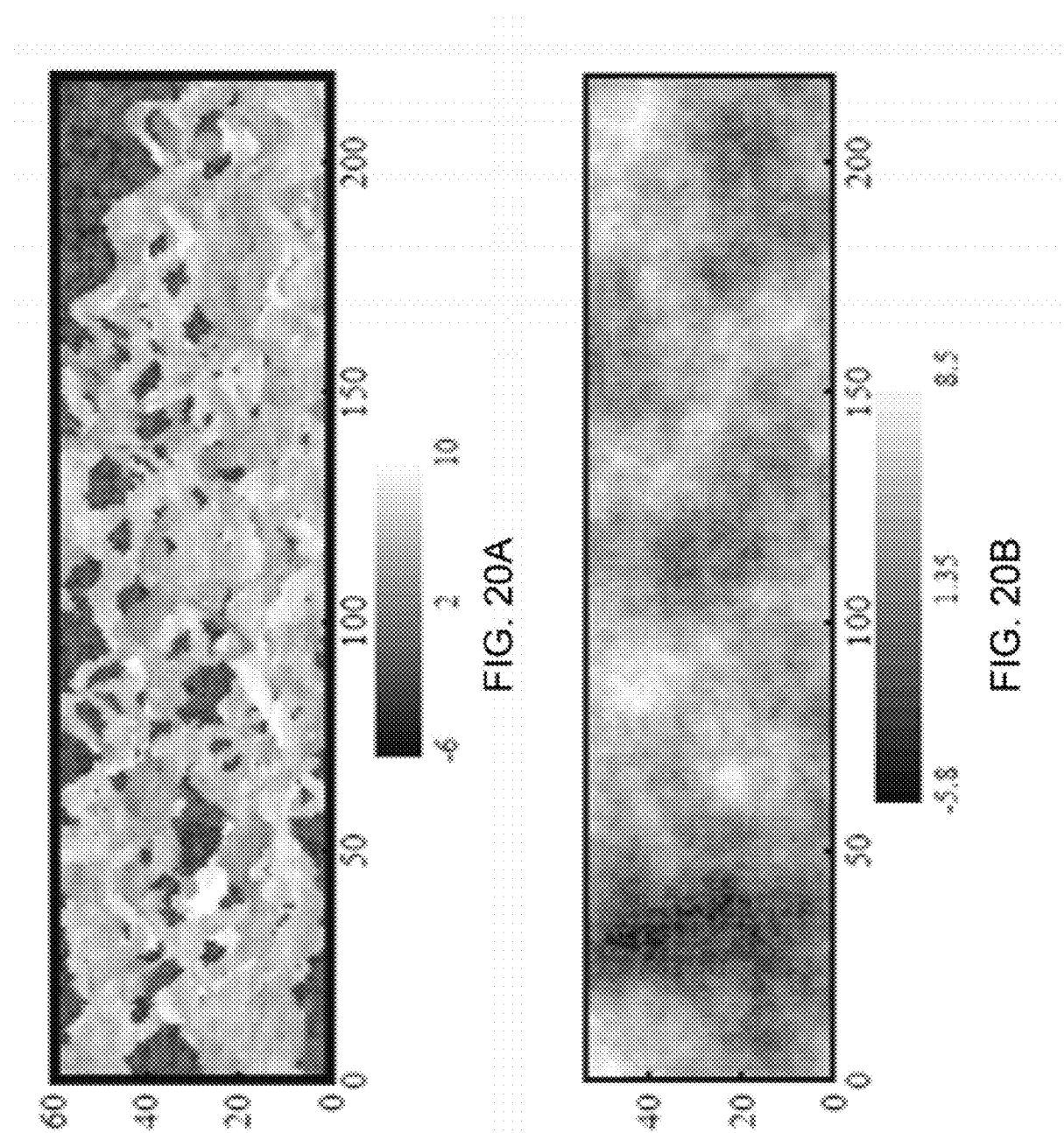

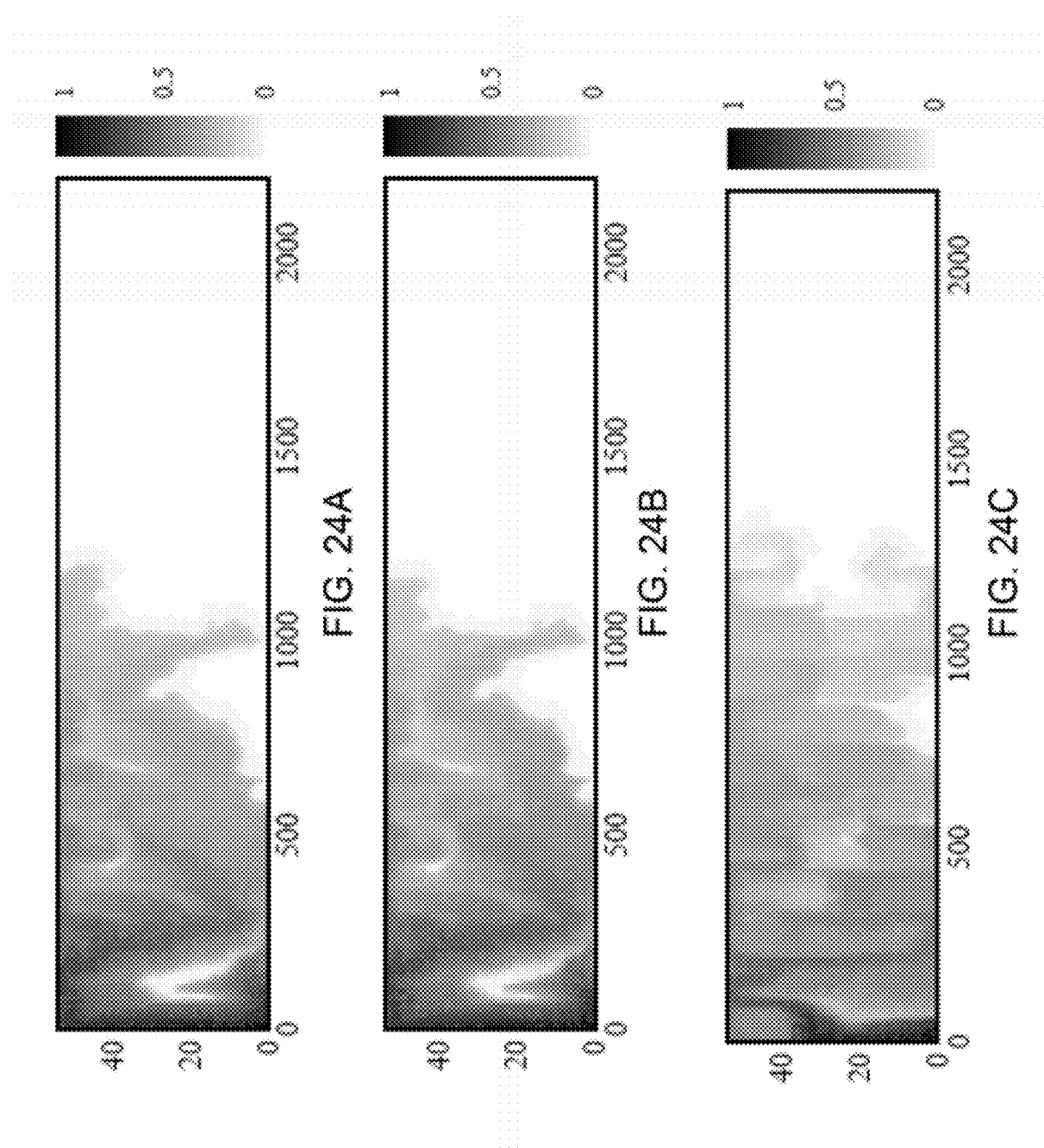

ITERATIVE MULTI-SCALE METHOD FOR FLOW IN POROUS MEDIA

CROSS-REFERENCE TO RELATED APPLICATION

The present application for patent claims the benefit of provisional patent application U.S. Ser. No. 61/104,154, filed Oct. 9, 2008, which the entirety of the application is incorporated herein by reference.

TECHNICAL FIELD

The disclosure generally relates to computer-implemented simulators for characterizing fluid flow within subsurface formations, and more particularly, to computer-implemented simulators that use multi-scale methods to simulate fluid flow within subsurface formations.

BACKGROUND

Natural porous media, such as subterranean reservoirs containing hydrocarbons, are typically highly heterogeneous and complex geological formations. While recent advances, specifically in characterization and data integration, have provided for increasingly detailed reservoir models, classical simulation techniques tend to lack the capability to honor the fine-scale detail of these structures. Various multi-scale methods have been developed to deal with this resolution gap.

These multi-scale methods, which can be used for simulation of fluid flow in a subterranean reservoir, can be categorized into multi-scale finite-element (MSFE) methods, mixed multi-scale finite-element (MMSFE) methods, and multi-scale finite-volume (MSFV) methods. These methods aim to reduce complexity of the reservoir model by incorporating the fine-scale variation of coefficients into a coarse-scale operator. This is similar to upscaling methods, which target coarse-scale descriptions based on effective, tensorial coefficients; however, multi-scale methods also allow for reconstruction of the fine-scale velocity field from a coarse-scale pressure solution. If a conservative fine-scale velocity field is obtained, which typically the MMSFE and MSFV methods can provide, the velocity field can then be used to solve the saturation transport equations on the fine grid. It will be appreciated by one skilled in that art, that for problems arising from flow and transport in porous media, a conservative velocity is desired for the transport calculations.

These multi-scale methods can be applied to compute approximate solutions at reduced computational cost. The multi-scale solutions can differ from the reference solutions that are computed with the same standard numerical scheme on the fine grid. While the permeability fields characterized by two separable scales typically converge with respect to coarse-grid refinement, these methods may not converge in the absence of scale separation due to error introduced by multi-scale localization assumptions. For instance, error introduced by a multi-scale method, with respect to the coarse cells, is typically prominent in the presence of large coherent structures with high permeability contrasts, such as nearly impermeable shale layers, where no general accurate localization assumption exists.

Multi-scale methods that are based on local numerical solutions of the fine-scale problem and thus honor the provided permeability field can be used to derive transmissibilities for the coarse problem. The quality of multi-scale results depends on the localization conditions employed to solve the local fine-scale problems. Previous methods have employed global information, such as an initial global fine-scale solution, to enhance the boundary conditions of the local problems. However, these methods may not provide value for fluid flow problems with high phase viscosity ratios, frequently changing boundary conditions, or varying well rates. Other methods have iteratively improved the coarse-scale operator. For instance, the adaptive local-global (ALG) upscaling approach is based on global iterations to obtain a self-consistent coarse-grid description. Recently, ALG was also employed to improve the local boundary conditions in the multi-scale finite volume element method (ALG-MSFVE). While the ALG method has shown to be more accurate than local upscaling methods and leads to asymptotic solutions for a large number of iterations, the solutions typically can be different from standard fine-scale solutions and the error due to ALG can be problem dependent.

SUMMARY

Computer-implemented iterative multi-scale methods and systems are provided for simulation of anisotropic, heterogeneous domains. For example, a system and method can be configured to achieve simulation of structures where accurate localization assumptions cannot be made. The iterative method and system facilitates smoothing of the solution field by applying line relaxation in the spatial directions. The iterative smoothing procedure can be applied in fewer than all time steps of a computation. As an example, a system and method can include creating a fine grid, a coarse grid and a dual coarse grid, calculating dual basis functions on the dual coarse control volumes of the dual coarse grid by solving local elliptic problems, integrating a source term of an elliptic pressure equation over each coarse cell of the coarse grid, and for at least one timestep in a plurality of timesteps, calculating a pressure using an iterative method, where the pressure calculated using the iterative method in the at least one timestep can be used to model fluid flow in the subsurface reservoir.

As another example, a multi-scale computer-implemented method and system is provided for use in modeling fluid flow in a subsurface reservoir. The system and method can include creating a fine grid defining a plurality of fine cells associated with a geological formation of the subsurface reservoir, a coarse grid defining a plurality of coarse cells having interfaces between the coarse cells, the coarse cells being aggregates of the fine cells, and a dual coarse grid defining a plurality of dual coarse control volumes, the dual coarse control volumes being aggregates of the fine cells and having boundaries bounding the dual coarse control volumes. In this example, the basis functions can be calculated on the dual coarse control volumes by solving local elliptic problems, and a source term of an elliptic pressure equation can be integrated over each coarse cell. The fine grid can be an unstructured grid.

For at least one timestep in a plurality of timesteps, the computation can include calculating a pressure using an iterative method. In an example, the iterative method can include, for each iteration: applying a smoothing scheme to a solution for the pressure over a fine grid from a previous iteration to provide a smoothed fine-grid pressure; calculating correction functions using the smoothed fine-grid pressure; applying a restriction operation that includes the correction functions to solve for the pressure over a coarse grid; and applying a prolongation operation to the pressure solved over the coarse grid to reconstruct an updated solution for the pressure over the fine-grid. The pressure calculated using the iterative method in the at least one timestep can be used to model fluid flow in a subsurface reservoir. In an example, the steps of the iterative method can be repeated until the solution for the pressure over the fine-grid converges.

In another example, a system and method can include, prior to calculating the pressure using the iterative method, a step of initializing the value for the pressure in the fine cells of a fine grid by setting that value equal to zero. The solution for the pressure over the fine grid in can be calculated using the calculated basis functions and the integrated source term. In yet another example, a system and method can include re-computing the dual basis functions and the correction functions in a timestep and over the dual coarse control volumes where a change of the mobility coefficient of the local elliptic problems exceeds a predetermined threshold value.

The step of applying the smoothing scheme to the solution of the pressure over the fine grid can include applying a line-relaxation smoothing operation. Applying the line-relaxation smoothing operation can include: applying a linear operator that has a tri-diagonal structure to the solution of the pressure over the fine grid to provide a linear system of equations; and solving the linear system of equations using a Thomas algorithm.

A system and method can include outputting or displaying the pressure calculated using the iterative method in the at least one timestep.

As another example, a multi-scale computer-implemented method and system for use in modeling fluid flow in a subsurface reservoir can include computing a model using a finite volume method in a plurality of timesteps. The model can include one or more variables representative of fluid flow in the subsurface reservoir, where at least one of the one or more variables representative of fluid flow is responsive to calculated basis functions. The computing can include calculating basis functions on dual coarse control volumes of a dual coarse grid by solving local elliptic problems, integrating a source term of an elliptic pressure equation over each coarse cell of a coarse grid, and for at least one timestep of the plurality of timesteps, calculating a pressure using an iterative method. The results from the computed model, including the pressure calculated using the iterative method in the at least one timestep, can be used to model fluid flow in the subsurface reservoir.

The iterative method can include, for each iteration: applying a smoothing scheme to a solution for the pressure over a fine-grid from a previous iteration to provide a smoothed fine-grid pressure; calculating correction functions using the smoothed fine-grid pressure; solving for the pressure on a coarse grid using the correction functions; and reconstructing a solution for the pressure over the fine-grid using the result from solving for the pressure on the coarse grid. In an example, the smoothing scheme can include applying $n_s$ smoothing steps, where $n_s$ is a positive integer greater than 1. In another example, solving for the pressure on the coarse grid can include calculating the right-hand side of the linear system for the pressure over the coarse-grid using the correction functions, and solving for the pressure on the coarse grid using the calculated right-hand side of the linear system for the pressure over the coarse-grid. The steps of the iterative method can be repeated until the solution for the pressure over the fine-grid converges.

A system and method can include outputting or displaying the computed model including the pressure calculated using the iterative method in the at least one timestep.

In another example, a system and method can include re-computing the basis functions and the correction functions in the timestep and over the dual coarse control volumes where a change of the mobility coefficient of the local elliptic problems exceeds a predetermined threshold value. In another example, the system and method can include re-computing the correction functions in a timestep where the source term exceeds a predetermined limit.

A step of applying a smoothing scheme to the solution of the pressure over a fine grid can include applying a line-relaxation smoothing operation, including: applying a linear operator that has a tri-diagonal structure to the solution of the pressure over the fine grid to provide a linear system of equations; and solving the linear system of equations using a Thomas algorithm.

A system for use in modeling fluid flow in a geological formation of a subsurface reservoir using a model is also provided. The system can including one or more data structures resident in a memory for storing data representing a fine grid, a coarse grid, a dual coarse grid, and dual basis functions calculated on the dual coarse control volumes by solving local elliptic problems; software instructions, for executing on one or more data processors, to compute the model using a finite volume method in at least two timesteps, and a visual display for displaying fluid flow in the geological formation of the subsurface reservoir using the computed model, including the pressure calculated using the iterative method in the at least two timestep. The model can include one or more variables representative of fluid flow in the subsurface reservoir, where at least one of the one or more variables representative of fluid flow is responsive to calculated basis functions. The computing can include calculating the basis functions on the dual coarse control volumes by solving local elliptic problems; integrating a source term of an elliptic pressure equation over each coarse cell; and for at least one timestep of the at least two timesteps, calculating a pressure using an iterative method.

The iterative method can include, for each iteration: applying a smoothing scheme to a solution for the pressure over the fine-grid from a previous iteration to provide a smoothed fine-grid pressure; calculating correction functions using the smoothed fine-grid pressure; solving for the pressure on the coarse grid using the correction functions; and reconstructing a solution for the pressure over the fine-grid using the result from solving for the pressure on the coarse grid.

As an illustration of an area of use for such techniques, the techniques can be used with a method for operating a subsurface reservoir to achieve improved production of a reservoir fluid (e.g., oil) from a geological formation of the subsurface reservoir. For example, a system and method can include injecting a displacement fluid into a portion of the geological formation of the subsurface reservoir, and applying a reservoir fluid production process to the subsurface reservoir under at least one operational condition that is derived based on the results from executing the steps of any of the foregoing techniques. Nonlimiting examples of operational conditions are displacement fluid injection rate, reservoir fluid production rate, viscosity ratio of displacement fluid to reservoir fluid, location of injection of the displacement fluid, location of production of the reservoir fluid, displacement fluid saturations, reservoir fluid saturations, displacement fluid saturations at different pore volumes injected, and reservoir fluid saturations at different pore volumes injected.

BRIEF DESCRIPTION OF THE DRAWINGS

FIG. 11A is an illustration of convergence rates in a heterogeneous domain for a number of smoothing steps as a function of upscaling factors.

FIG. 11B is an illustration of convergence rates in a heterogeneous domain for various aspect ratios as a function of upscaling factors.

FIGS. 20A and 20B are illustrations of permeability fields in a domain for the top and bottom layers of a 3D SPE10 test case.

FIG. 24A is an illustration of the fine-scale reference solution of a two-phase saturation map for the top layer of a 3D SPE10 test case.

FIG. 24B is an illustration of the iterative multi-scale solution of a two-phase saturation map for the top layer of a 3D SPE10 test case.

FIG. 24C is an illustration of the original multi-scale finite volume solution of a two-phase saturation map for the top layer of a 3D SPE10 test case.

DETAILED DESCRIPTION

Figure 1:
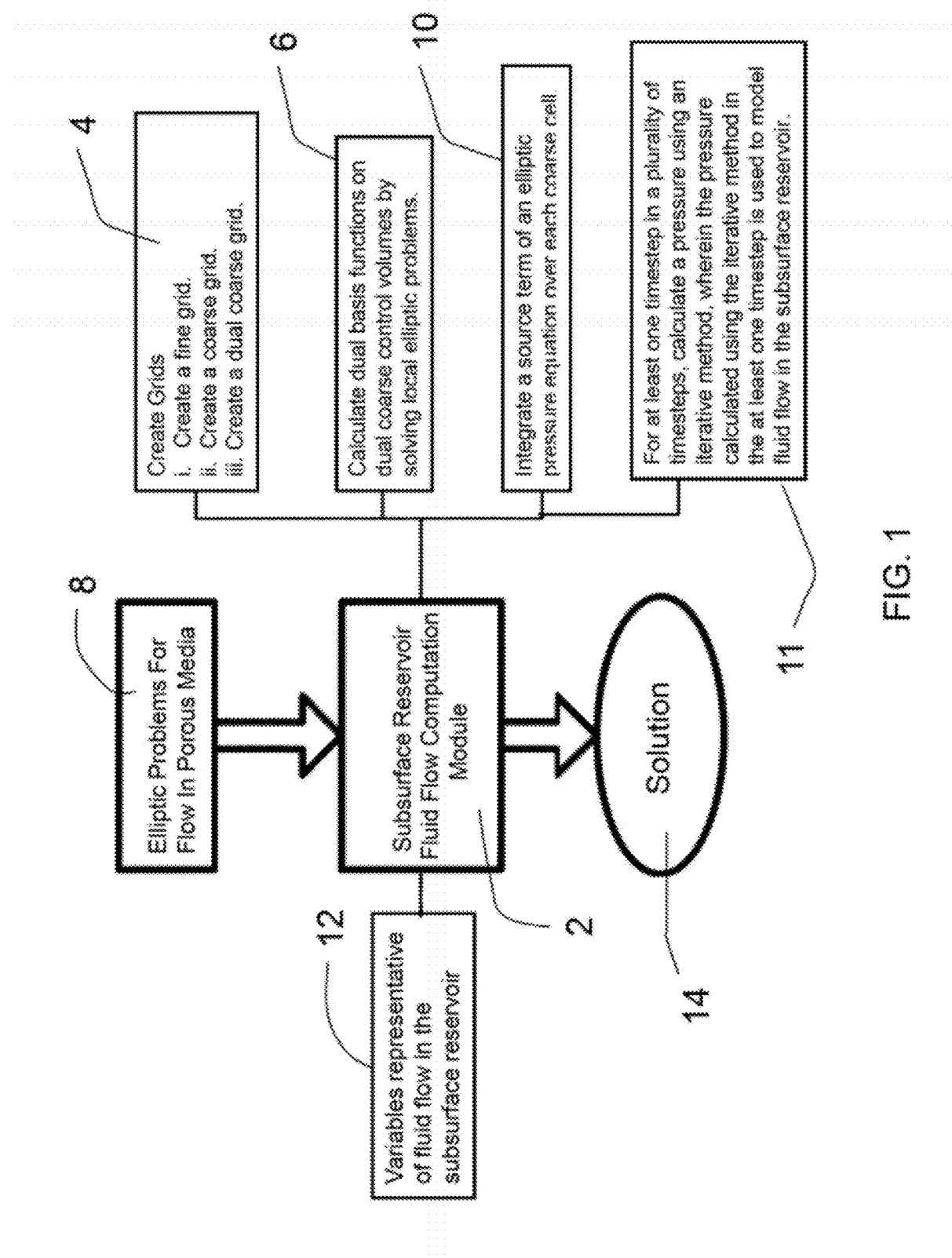
FIG. 1 is a block diagram of an example computer structure for use in modeling fluid flow in a subsurface reservoir.

FIG. 1 depicts a block diagram of an example computer-implemented system for use in modeling fluid flow in a subsurface reservoir using a model. The system utilizes multi-scale physics to analyze fluid flow within the subsurface reservoir.

The system can include a computation module 2 for performing the computations discussed herein. The computation of the model can be performed at process 4 on a system of grids (e.g., a fine grid, a coarse grid, and a dual coarse grid) as discussed in herein. Dual basis functions can be calculated at process 6 on the dual coarse control volumes of the dual coarse grid by solving local elliptic problems 8 for fluid flow in porous media. The model can include one or more variables 12 representative of fluid flow in the subsurface reservoir, wherein at least one of these variables is responsive to the calculated dual basis functions.

At process 10 in FIG. 1, a source term of an elliptic pressure equation is integrated over each coarse cell, and at process 11, for at least one timestep in a plurality of timesteps, a pressure is calculated using an iterative method, as discussed herein. The pressure calculated using the iterative method in the at least one timestep can be used to model fluid flow in the subsurface reservoir.

A multi-scale finite volume (MSFV) method is used for computing the model. Performance of the MSFV method can include calculating the dual basis functions on the dual control volumes of the dual coarse grid by solving elliptic problems (at process 6 of FIG. 1).

A result of the computation can be a pressure that is used to model fluid flow in the subsurface reservoir, or a computed model comprising the pressure calculated using the iterative method in the at least one timestep that is used to model fluid flow in the subsurface reservoir.

The solution or result 14 of the computation can be displayed or output to various components, including but not limited to, a visual display, a user interface device, a computer readable storage medium, a monitor, a local computer, or a computer that is part of a network.

To explain an embodiment of a MSFV method, consider the elliptic problem $$-\nabla \cdot (\lambda \cdot \nabla p) = q \quad \text{(Equation 1)}$$

on the domain $\Omega$ with the boundary conditions $\nabla p \cdot n = f$ and $p(x) = g$ at $\partial \Omega_1$, and $\partial \Omega_2$, respectively. Note that $\partial \Omega = \partial \Omega_1 \cup \partial \Omega_2$ is the whole boundary of the domain $\Omega$ and n is the outward unit normal vector. The mobility tensor $\lambda$ is positive definite and the right-hand sides q, f and g are specified fields. The MSFV method in this embodiment is designed to efficiently compute approximate solutions of Equation (1) for highly heterogeneous coefficients $\lambda$ and right-hand sides q, such as for mobility fields. Such mobility fields depict a high variance, complex correlation structures and typically can be governed by a large range of length scales.

Figure 2:
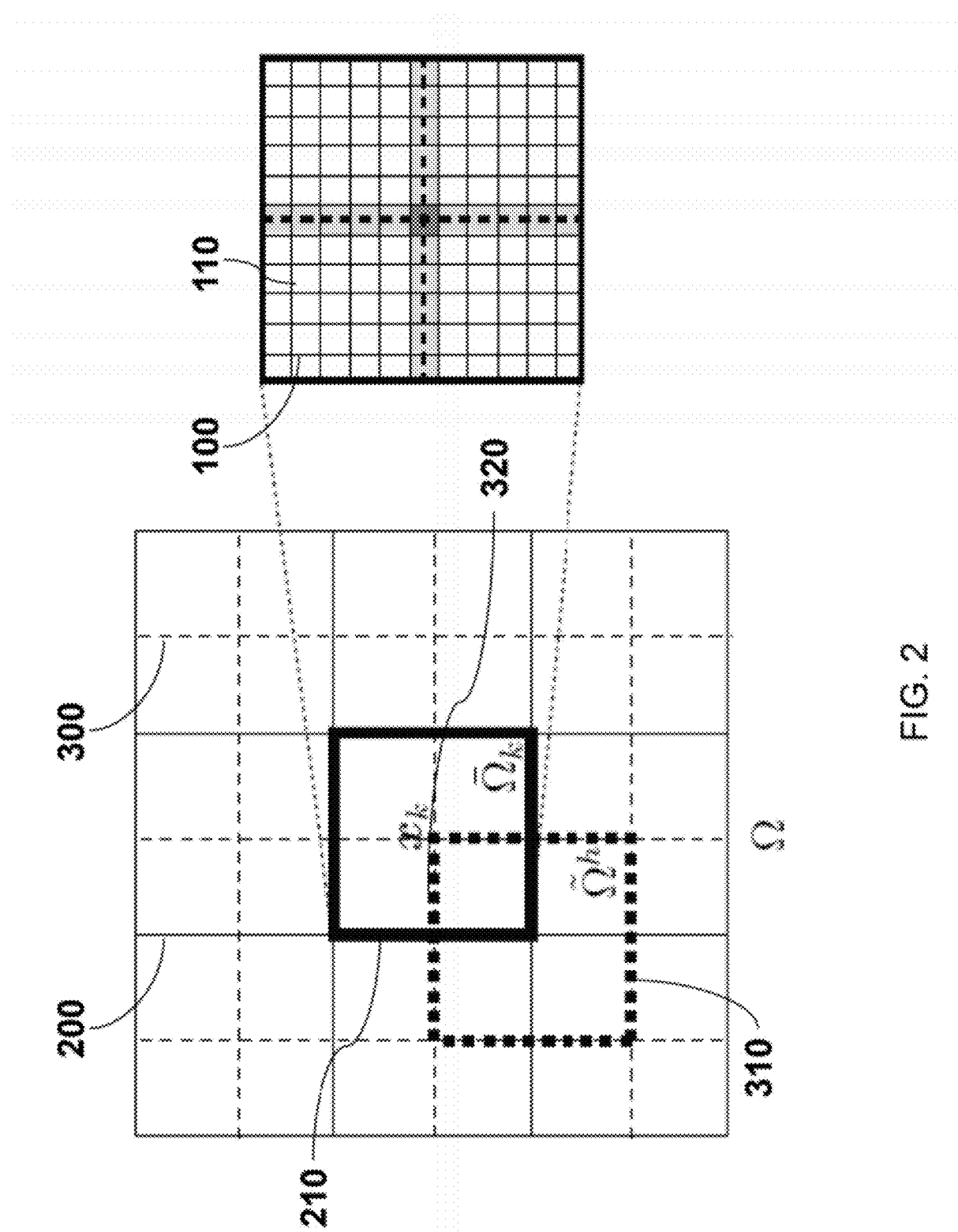
FIG. 2 is a schematic view of a 2D grid domain showing an enlarged coarse cell.

To illustrate further an MSFV technique, FIG. 2 depicts a grid system which includes a fine-scale grid 100, a conforming primal coarse-scale grid 200 shown in solid line, and a conforming dual coarse-scale grid 300 shown in dashed line. The fine-scale grid 100 is comprised of a plurality of fine cells 110. The primal coarse-scale grid 200 has M primal coarse cells 210 and is constructed on the fine-scale grid 100 such that each primal coarse cell 210, $\overline{\Omega}_k (k \in [1, M])$, is comprised of multiple fine cells 110. The dual coarse-scale grid 300, which also conforms to the fine-scale grid 100, can be constructed such that each dual coarse control volume or cell 310, $\tilde{\Omega}^h (h \in [1, N])$, is comprised of multiple fine cells 110. For example in FIG. 2, both the primal coarse cells 210 and dual coarse cells 310 contain 11×11 fine cells. Each dual coarse cell 310 depicted in FIG. 2 is defined by nodes 320, $x_k$, of the dual coarse-scale grid 300. As illustrated in FIG. 2, each primal coarse cell 210 ($\overline{\Omega}_k$) contains exactly one node 320, $x_k$, in its interior. Generally, each node 320 is centrally located in each primal coarse cell 210. For example, the dual coarse-scale grid 300 can be constructed by connecting nodes 320 contained within adjacent primal coarse cells 210. One skilled in the art will appreciate that the primal coarse-scale and dual coarse-scale grids can be much coarser than the underlying fine grid 300 on which the mobility field is represented. It is also emphasized that the multi-scale finite volume method is not limited to the grids shown in FIG. 2, as very irregular grids or decompositions can be employed, as well as other sized grids such as the coarse cells containing 5×5 or 7×7 fine cells.

Figure 3B:
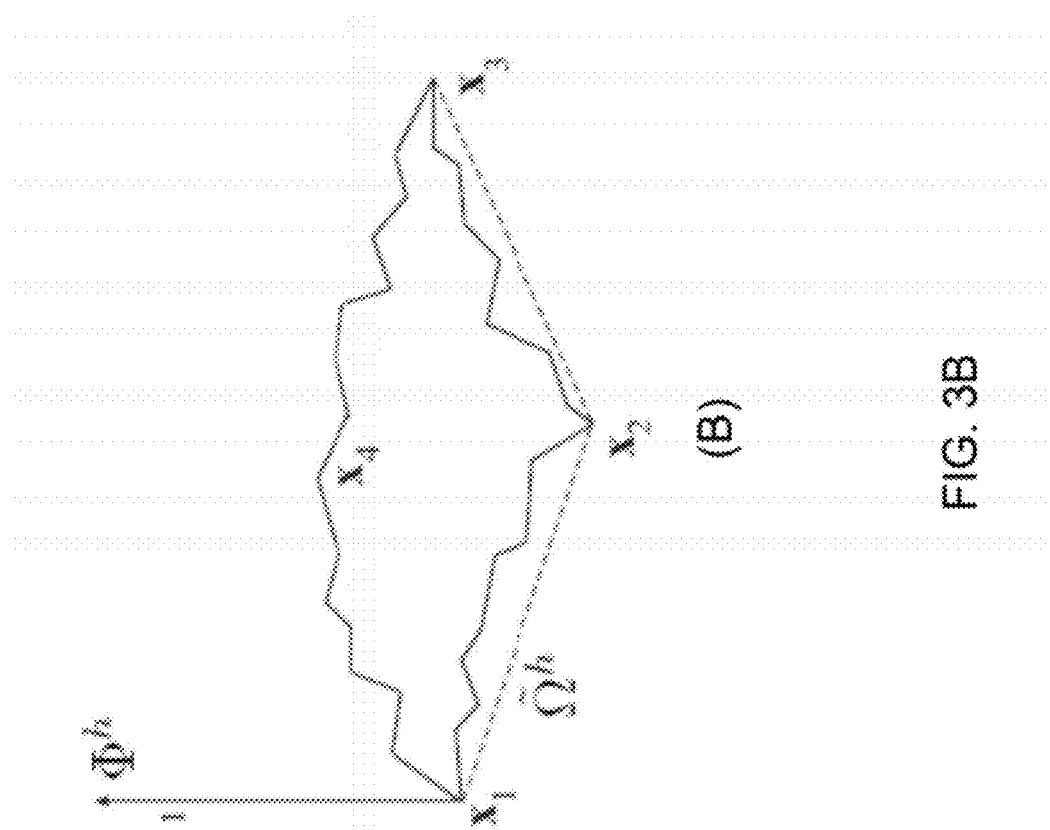
FIG. 3B is an illustration of a surface graph showing a 2D correction function.
Figure 3A:
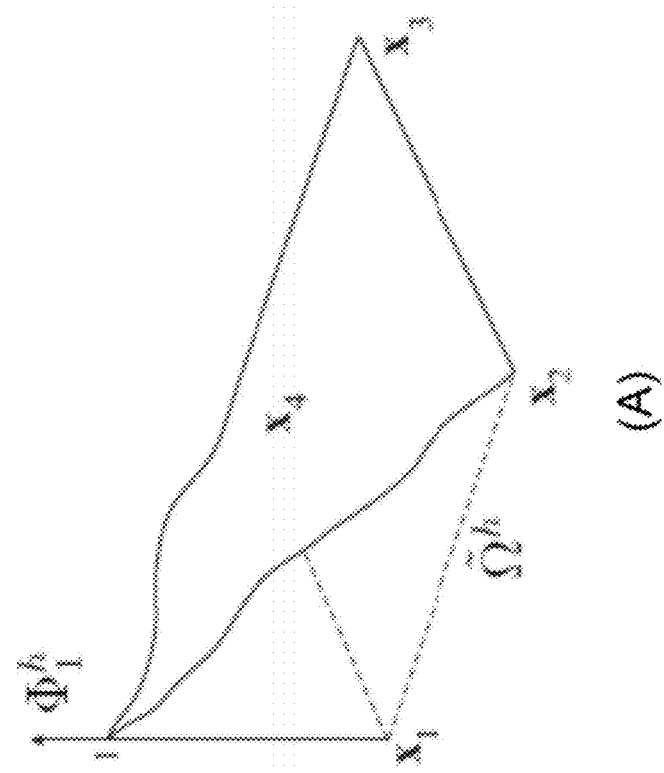
FIG. 3A is an illustration of a surface graph showing a 2D basis function.

The reduction of degrees of freedom to describe the pressure field on the fine-scale grid 100 (fine pressure $p_f$) can be achieved through the approximation $$p_f(x) \approx p'(x) = \sum_{h=1}^{N} \left[ \sum_{k=1}^{M} \Phi_k^h(x) \overline{p}_k + \Phi^h(x) \right] \quad \text{(Equation 2)}$$

where $\overline{p}_k$ are the pressure values at $x_k$ nodes 320. The basis functions can be represented as $\Phi_k^h$ and the correction function as $\Phi^h$. Opposed to classic finite-element methods, the basis functions and correction functions are typically not analytical functions. For example, the basis functions and correction functions can be local numerical solutions of Equation (1) on $\tilde{\Omega}^h$ without and with right-hand side, respectively. Localization can be achieved by employing reduced problem boundary conditions at $\partial \tilde{\Omega}^h$, which is equivalent to $$(\tilde{n}^h \cdot \nabla)((\lambda \cdot \nabla \Phi_k^h) \cdot \tilde{n}^h) = 0 \quad \text{(Equation 3)}$$

and $$(\tilde{n}^h \cdot \nabla)((\lambda \cdot \nabla \Phi^h) \cdot \tilde{n}^h) = r^h \quad \text{(Equation 4)}$$

at $\partial \tilde{\Omega}^h$ with $\tilde{n}^h$ being the unit normal vector pointing out of $\tilde{\Omega}^h$. At the dual-grid nodes $x_l$ which belong to $\tilde{\Omega}^h$, $\Phi_k^h(x_l) = \delta_{kl}$ and $\Phi^h(x_l) = 0$. By construction, outside $\tilde{\Omega}^h$, the $\Phi_k^h$ and $\Phi^h$ can be set to zero. An illustration of 2D basis and correction functions is shown in FIG. 3A-B, where FIG. 3A shows the 2D basis function and FIG. 3B shows the 2D correction function.

To derive a linear system for the coarse pressure values $\overline{p}_k$, one can substitute p' of Equation (2) into Equation (1) and integrate over $\overline{\Omega}_l$, which leads to $$-\int_{\overline{\Omega}_l} \nabla \cdot (\lambda \cdot \nabla p') d\Omega = \quad \text{(Equation 5)}$$

$$-\int_{\overline{\Omega}_l} \nabla \cdot \left( \lambda \cdot \nabla \left( \sum_{h=1}^{N} \left( \sum_{k=1}^{M} \Phi_k^h \overline{p}_k + \Phi^h \right) \right) \right) d\Omega = -\int_{\overline{\Omega}_l} q d\Omega$$

for all $l \in [1, M]$. With the Gauss theorem one obtains $$-\int_{\partial \overline{\Omega}_l} \left( \lambda \cdot \sum_{h=1}^{N} \left( \sum_{k=1}^{M} \overline{p}_k \nabla \Phi_k^h + \nabla \Phi^h \right) \right) \cdot \overline{n}_l d\Gamma = \quad \text{(Equation 6)}$$

$$\sum_{k=1}^{M} \overline{p}_k \sum_{h=1}^{N} \int_{\partial \overline{\Omega}_l} (-\lambda \cdot \nabla \Phi_k^h) \cdot \overline{n}_l d\Gamma +$$

$$\sum_{h=1}^{N} \int_{\partial \overline{\Omega}_l} (-\lambda \cdot \nabla \Phi^h) \cdot \overline{n}_l d\Gamma = \int_{\overline{\Omega}_l} q d\Omega$$

which results in the linear system $$A_{lk} \overline{p}_k = b_l \quad \text{(Equation 7)}$$

for $\overline{p}_k$ with $$A_{lk} = \sum_{h=1}^{N} \int_{\partial \overline{\Omega}_l} (-\lambda \cdot \nabla \Phi_k^h) \cdot \overline{n}_l d\Gamma \quad \text{(Equation 8)}$$

and $$b_l = \int_{\overline{\Omega}_l} q d\Omega - \sum_{h=1}^{N} \int_{\partial \overline{\Omega}_l} (-\lambda \cdot \nabla \Phi^h) \cdot \overline{n}_l d\Gamma \quad \text{(Equation 9)}$$

The unit normal vector $\overline{n}_l$ points out of $\overline{\Omega}_l$. Note that the right-hand side $b_l$ also contains the effects of the fine-scale fluxes across $\partial \overline{\Omega}_l$ induced by the correction functions $\Phi^h$.

With $\overline{p}_k$ and the superposition of Equation (2) one obtains the fine-scale pressure p', which is an approximation of the fine-scale reference solution $p_f$. In the MSFV method the difference between p' and $p_f$ can be solely due to the localization assumption of Equation (4), i.e., with $$r^h = (\tilde{n}^h \cdot \nabla)((\lambda \cdot \nabla p_f) \cdot \tilde{n}^h) \text{ at } \partial \tilde{\Omega}^h \; \forall h \in [1, N] \quad \text{(Equation 10)}$$

the two fine-scale pressure fields become identical.

For a wide range of examples, the MSFV method with $r^h=0$ can lead to accurate results. In other words, the reduced problem boundary conditions typically provide a good localization assumption.

For multiphase problems, a conservative fine-scale velocity field can maintain mass-balance of the transported phase saturations. The velocity $$u' = -\lambda \cdot \nabla p' \quad \text{(Equation 11)}$$

fulfills this requirement in a weak sense, that is, while it is conservative for each coarse volume $\overline{\Omega}_k$, it is not conservative at the fine-scale. Therefore, a further step can be applied to solve saturation transport on the fine grid. To reconstruct a conservative fine-scale velocity field u″, which is consistent with u', the additional local problems $$-\nabla \cdot (\lambda \cdot \nabla p''_k) = q \text{ on } \overline{\Omega}_k \quad \text{(Equation 12)}$$

with $$(\lambda \cdot \nabla p''_k) \cdot \overline{n}_k = (\lambda \cdot \nabla p') \cdot \overline{n}_k \text{ at } \partial \overline{\Omega}_k \quad \text{(Equation 13)}$$

are solved. The velocity field $$u'' = \begin{cases} \lambda \cdot \nabla p''_k & \text{on } \overline{\Omega}_k \\ \lambda \cdot \nabla p' & \text{at } \partial \overline{\Omega}_k \end{cases} \quad \text{(Equation 14)}$$

for all $k \in [1, M]$ is conservative (provided p″ is obtained with a conservative scheme) and can be employed to solve transport equations on the fine grid. For multiphase subsurface flow problems, for example, saturation transport may be calculated explicitly or implicitly. Since the mobility λ can depend on the saturations in the implicit version, iterations can be performed between the pressure Equation (1), which is solved with the MSFV method, and the transport equations. Good efficiency can be achieved when the transport equations are solved implicitly on the individual domains $\overline{\Omega}_k$. A Schwarz overlap scheme can then be employed to couple the local solutions. With this technique, which can be very efficient for hyperbolic problems, the low computational complexity of the overall MSFV method can be maintained for multiphase flow.

The MSFV method can be adaptive, which provides several benefits to the user. For example, the conservative velocity reconstruction described above can be required in coarse cells $\overline{\Omega}_k$ where fine-scale transport is of interest. Moreover, the basis and correction functions can advantageously be stored and reused for subsequent time steps. The basis and correction functions can be recomputed in dual cells $\tilde{\Omega}^h$ where changes of the coefficient λ exceeds a specified limit. Additionally, the correction functions can be recomputed when the right-hand side q exceeds a specified limit. In order to make the MSFV method more applicable for simulation of fluid flow within a subterranean reservoir, the MSFV method can be extended to cover factors such as compressibility, gravity, and complex well schemes. These extended versions of the MSFV method can prove to be effective for computation of a wide range of examples for which the multi-scale and fine-scale solutions are in agreement.

An iterative MSFV (i-MSFV) method is discussed. As already pointed out, the difference between the MSFV solution p' and the fine scale reference pressure $p_f$ can be due to the localization assumptions, such that p' and $p_f$ become identical if the boundary conditions obtained through Equation (4) are employed in fulfillment of $r^h$ which is given in Equation (10). However, Equation (10) can require a priori knowledge of $p_f$.

A convergent iterative procedure to improve the localization boundary conditions, which does not depend on $p_f$, can be used. Therefore, the iterative improvement of $r^h$ can be written as $$r^{h(t)} = (\tilde{n}^h \cdot \nabla)((\lambda \cdot \nabla p'^{(t)}_s) \cdot \tilde{n}^h) \text{ at } \partial \tilde{\Omega}^h \; \forall h \in [1,N] \quad \text{(Equation 15)}$$

The superscript (t) denotes the iteration level and $$p'^{(t)}_s = S^{n_s} \cdot p'^{(t)} = S^{n_s} \cdot \sum_{h=1}^{N} \left[ \sum_{k=1}^{M} \Phi^h_k \overline{p}^{(t)}_k + \Phi^{h(t-1)} \right] \quad \text{(Equation 16)}$$

is the smoothed MSFV fine-scale pressure approximation, where S is a linear smoothing operator and $n_s$ represents the number of smoothing steps. One skilled in the art will recognize that the correction functions $\Phi^{h(t-1)}$ can be based on the local boundary conditions of Equation (4) with $r^h = r^{h(t-1)}$.

For a more compact presentation of the iterative MSFV (i-MSFV) method, the fine-grid values of $p'_s$, p', $\Phi^h_k$, and $\Phi^h$ can be ordered in vectors $p'_s$, p', $\Phi^h_k$, and $\Phi^h$ with entries $[p'_s]_i$, $[p']_i$, $[\Phi^h_k]_i$, and $[\Phi^h]_i$, respectively. The linear equations involved in this iterative procedure can be expressed in matrix form by writing $$[\Phi^{h(t-1)}]_i = C^h_{ij}[p'^{(t-1)}_s]_j + E^h_i \quad \text{(Equation 17)}$$

$$A_{lk} \overline{p}^{(t)}_k = \frac{Q_l}{\int_{\overline{\Omega}_l} q d\Omega} + \frac{D_{li}[\Phi^{h(t-1)}]_i}{-\sum_{h=1}^{N} \int_{\partial \overline{\Omega}_l} (-\lambda \cdot \nabla \Phi^{h(t-1)}) \cdot \overline{n}_l d\Gamma} \quad \text{(Equation 18)}$$

$$[p'^{(t)}_s]_i = [S^{n_s}]_{ij} \sum_{h=1}^{N} \left( [\Phi^h_k]_j \overline{p}^{(t)}_k + [\Phi^{h(t-1)}]_j \right) \quad \text{(Equation 19)}$$

Equation (17) corresponds to the localized problems for the correction functions $\Phi^{h(t-1)}$, as following from the original elliptic equation of Equation (1) with the boundary condition of Equation (4) defined according to Equation (15). The terms on the right-hand side express the linear dependence of $\Phi^{h(t-1)}$ on the smoothed pressure field $p'^{(t-1)}_s$ at the previous iterative step (due to the iterative boundary condition of Equation (15)) and on the source term q of the elliptic problem, respectively. Equation (18) corresponds to the coarse-scale problem of Equation (5), and is equivalent to Equations (7)-(9). Finally, Equation (19) expresses the iterative reconstruction formula of Equation (16). Combining Equations (17), (18), and (19) and introducing the identity matrix I, the following linear relation can be obtained:

$$[p'^{(t)}_s]_i = \underbrace{[S^{n_s}]_{ij} \sum_{h=1}^{N} \left( [\Phi^h_k]_j A^{-1}_{kl}(Q_l + D_{lq}E^h_q) + E^h_j \right)}_{b^*_i} + \underbrace{[S^{n_s}]_{ij} \sum_{h=1}^{N} \left[ ([\Phi^h_k]_j A^{-1}_{kl} D_{lq} + I_{jq}) C^h_{qr} \right] [p'^{(t-1)}_s]_r}_{A^{*(n_s)}_{iq}} \quad \text{(Equation 20)}$$

between the smoothed fine-scale pressure fields $p'^{(t-1)}_s$ and $p'^{(t)}_s$, at two consecutive iteration steps.

Figure 4:
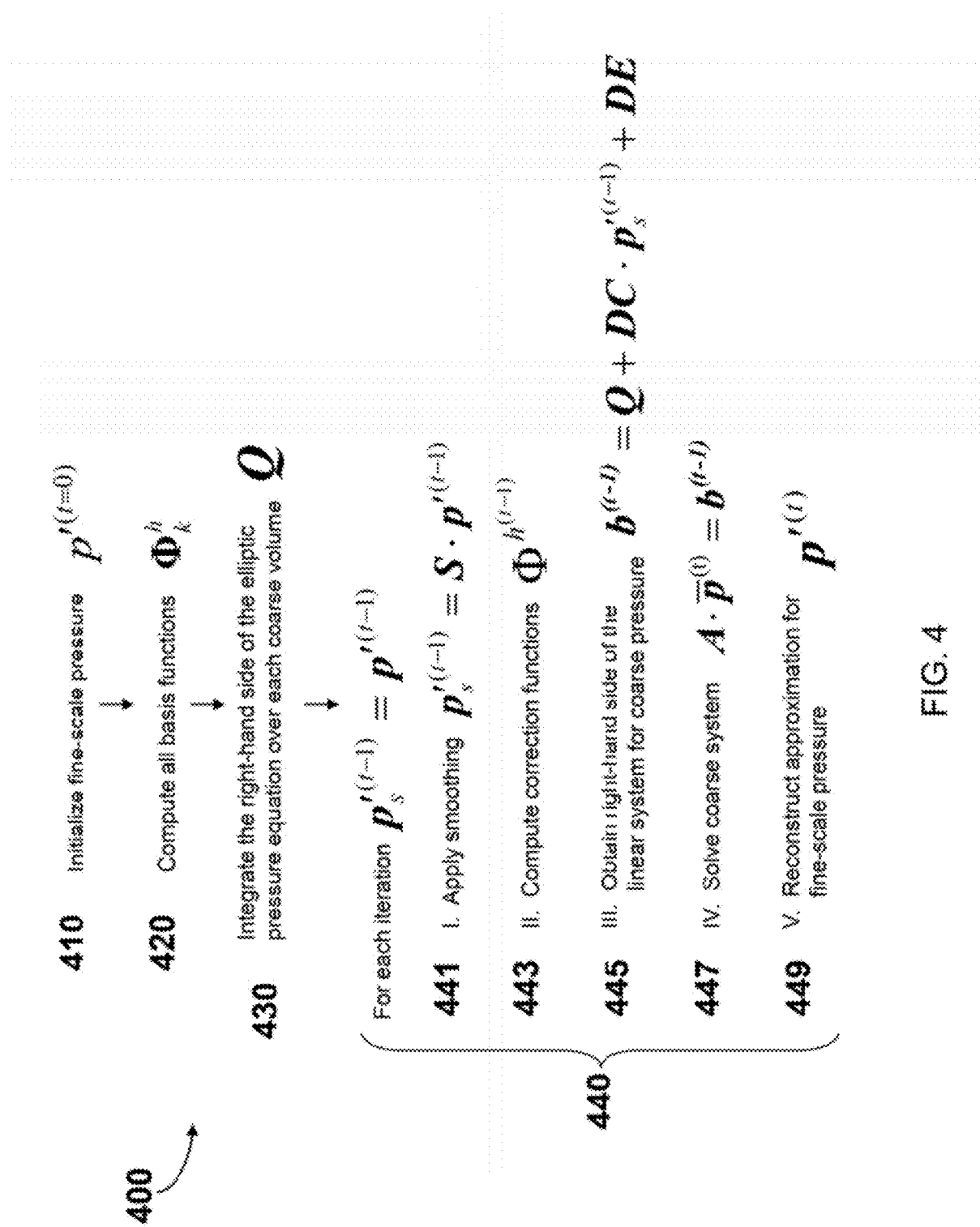
FIG. 4 is a flowchart illustrating steps used in a reservoir simulator employing an iterative multi-scale method.

A process flowchart of the i-MSFV method 400 is shown in FIG. 4. The fine-scale pressure is initialized in step 410. For example, in step 410 the fine-scale pressure can be set to zero.

Basis functions are computed in step 420 and the right-hand side of the elliptic pressure equation is integrated over each coarse volume in step 430. One skilled in the art will appreciate that these steps can be performed once and can then be followed by the main iteration loop. At the beginning of each iteration of step 440, $n_s$ thing steps 441 can be applied, and the smoothed fine-scale pressure is employed to compute the correction functions in step 443. The correction functions are used to obtain the right-hand side of the linear system for the coarse pressure, which is shown in step 445. At the end of each iteration, the coarse system is solved in step 447 and the new fine-scale pressure approximation is reconstructed in step 449. The components of the vector $\bar{p}$ can be the actual pressure values at the dual coarse-grid nodes. This process can be expressed in algorithmic form such that it can be employed for use in a reservoir simulator to simulate fluid flow within a subterranean reservoir:

```
initialize p'^(t=0)
∀h : ∀k : compute basis functions Φ_k^h
calculate Q ; Equation (18)
for t = 1 to number of i-MSFV iterations {
    p'_s^(t-1) = p'^(t-1)
    for i = 1 to n_s {
        p'_s^(t-1) = S · p'^(t-1) ; smoothing step
    }
    ∀h : compute correction function Φ^h'^(t-1) ; based on p'_s^(t-1)
    calculate b^(t-1) = Q + DC · p'_s^(t-1) + DE ; Equation (18)
    solve coarse system A · p̄^(t) = b^(t-1) ; Equation (18)
    reconstruct p'^(t) ; Equation (2)
}
```

The i-MSFV method can be interpreted as a multi-grid method, where differential equations are solved using a hierarchy of discretizations. The i-MSFV method can include smoothing, restriction, and prolongation steps which are typical operations employed in multi-grid methods. For example, the i-MSFV method can include a smoothing step to improve the approximate fine-grid solution $p'^{(t-1)}$, a restriction step to obtain the right-hand side $b^{(t-1)}$ of the coarse grid system that can be used for solving the pressure values $\bar{p}^{(t)}$, and a prolongation step to acquire the updated fine-grid solution.

Figure 5:
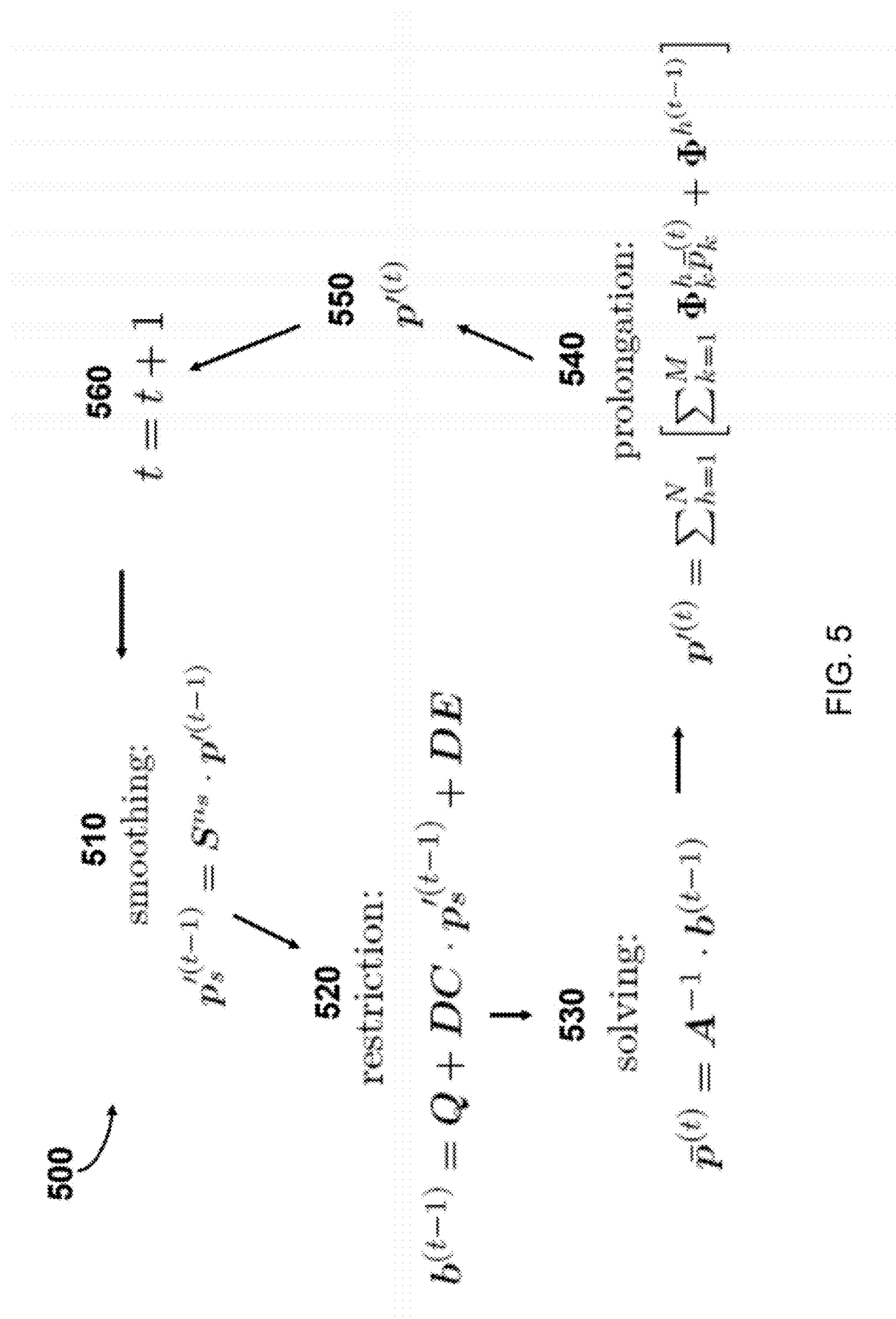
FIG. 5 is a flowchart illustrating multi-grid steps used in a reservoir simulator employing an iterative multi-scale method.

In FIG. 5, the i-MSFV method 500, schematically depicted as a multi-grid method, includes applying $n_s$ thing steps 510 to improve the approximate fine-grid pressure solution $p'^{(t-1)}$. For example, smoothing steps 510 can be performed by an iterative linear solver. The smoothed fine-scale pressure can be employed to update the correction functions $\Phi^{h'(t-1)}$. One skilled in the art will appreciate that the coarse-grid operator A, which is based on the basis functions $\Phi_k^h$, can be constructed a single time; whereas, the correction functions $\Phi^{h'(t-1)}$ can undergo iterative refinement. The updated correction functions $\Phi^{h'(t-1)}$ can be used in a subsequent restriction step 520 to obtain the right-hand side of the linear system for the coarse pressure. In particular, restriction step 520 leads to the right-hand side $b^{(t-1)}$ of the coarse grid system, which can be used for solving the pressure values $\bar{p}^{(t)}$ at the dual coarse-grid nodes in step 530. For example, the coarse system can be solved with any suitable solver by solving $\bar{p}^{(t)} = A^{-1} b^{(t-1)}$. Due to the typically extreme coarsening factors, the coarse problem can be small enough to be solved directly. Once the coarse system is solved, the updated fine-grid pressure solution $p'^{(t)}$ can be obtained through prolongation shown in step 540. Prolongation can be achieved simply by superimposing the correction functions plus the basis functions weighted with the new coarse pressure values. The reconstructed approximation of the fine-grid pressure 550, $p'^{(t)}$, can then be used for the next iteration $t=t+1$ shown in step 560.

Although shown here for two grid levels, the i-MSFV method can be extended for more complex cycles. Moreover, it can be seen from the operations in FIGS. 4 and 5 that no assumptions regarding the topologies of the fine-scale and coarse-scale grids are made. For example, the same methodology can be applied for unstructured fine grids, and instead of coarse grids one can employ appropriate domain decompositions. The smoothing scheme can be utilized to achieve robustness and good convergence. For example, consistent line-relaxation works very well as a smoothing scheme due to the effectiveness of line-relaxation to distribute the residuum from the coarse-scale dual cell boundaries across the domain. Moreover, line-relaxation can depend weakly on the grid aspect ratio and on the level of anisotropy. One skilled in the art will appreciate that a different smoothing scheme can be used for unstructured fine grids.

Regarding fine-scale smoothing, the following is provided. As already mentioned herein, line-relaxation (LR) is one possibility to smooth the approximate fine-grid solution $p'^{(t-1)}$. However, other smoothing schemes can be used. To illustrate a smoothing scheme, line-relaxation can be employed in an example i-MSFV implementation. Therefore, consider the fine-scale system $$M \cdot p_f = R \quad \text{(Equation 21)}$$

which results form a conservative finite-volume discretization of Equation (1) on the fine grid. For simplicity, assume that the grid lines are parallel to the x-, y- and z-directions of a Cartesian coordinate system. The linear operator can be split as $M = M_x + M_y + M_z$, where $M_{x,y,z}$ represent the discretizations of the elliptic operator in the corresponding coordinate directions. If one operator plus the diagonal components of the other ones are treated implicitly, the following iterative scheme is obtained:

$$(M_x + \text{diag}(M_y + M_z)) \cdot p^{\upsilon+1/3} = R - (M_y + M_z - \text{diag}(M_y + M_z)) \cdot p^\upsilon \quad \text{(Equation 22)}$$

$$(M_y + \text{diag}(M_x + M_z)) \cdot p^{\upsilon+2/3} = R - (M_x + M_z - \text{diag}(M_x + M_z)) \cdot p^{\upsilon+1/3} \quad \text{(Equation 23)}$$

$$(M_z + \text{diag}(M_x + M_y)) \cdot p^{\upsilon+1} = R - (M_x + M_y - \text{diag}(M_x + M_y)) \cdot p^{\upsilon+2/3} \quad \text{(Equation 24)}$$

where $p^\upsilon$ is the approximate solution after the $\upsilon$-th line-relaxation step and $\text{diag}(M_x)$ represents the matrix with the diagonal of $M_x$. In this scheme, the three linear systems (22)-(24) are solved sequentially at each iteration. For a two-point flux approximation, the linear operators $M_{x,y,z}$ have a tri-diagonal structure and the systems (22)-(24) can be solved, for example with the Thomas algorithm, which has a linear complexity. Moreover, the three linear operators can further be split into independent linear systems for each grid line. This property can be useful for massive parallel computing, which can be advantageously used in the field of reservoir simulation. This iterative line-relaxation solver can be convergent, but for big problems the rate can be slow. In this multi-scale framework, however, few line-relaxation steps can be applied to smooth $p'^{(t-1)}$ sufficiently for an effective improvement of the local boundary conditions. The optimum number of smoothing steps per i-MSFV iteration can be case dependent.

EXAMPLE NUMERICAL RESULTS

Figure 6B:
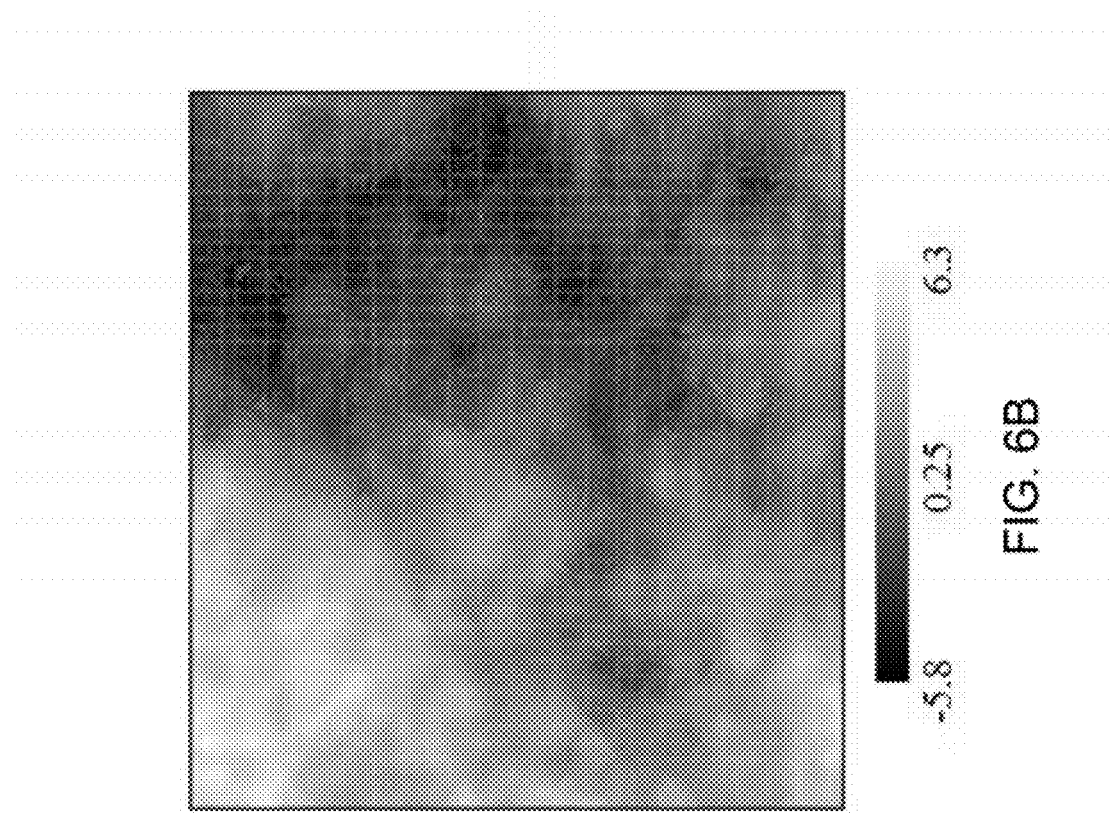
FIG. 6B is a schematic view of a 2D heterogeneous mobility field.
Figure 6A:
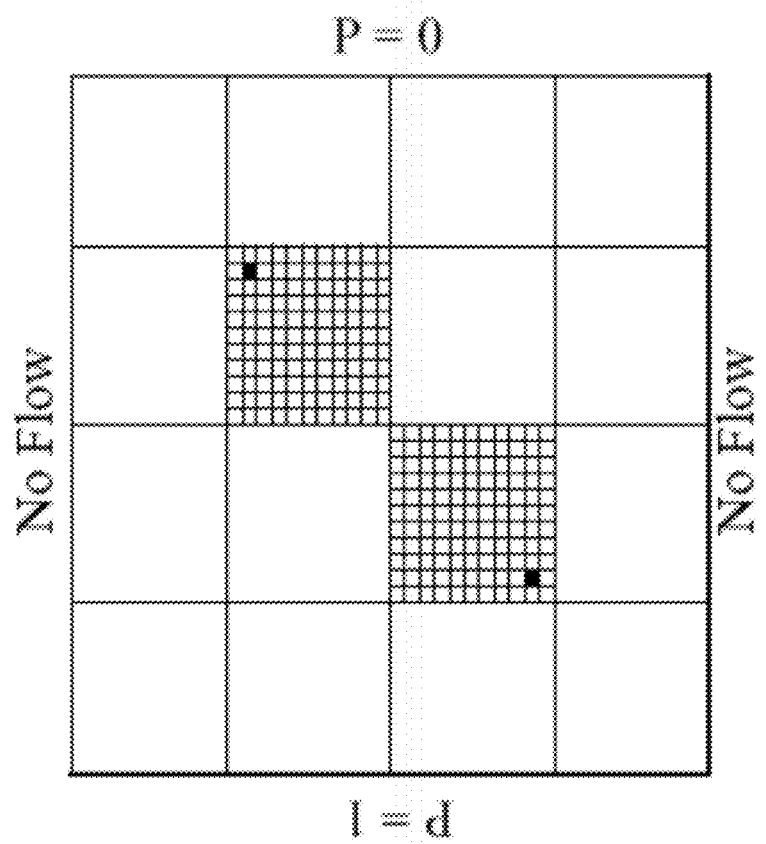
FIG. 6A is a schematic view of a 2D grid showing a homogenous domain.

The convergence rate of the i-MSFV method can be assessed. The first set of examples discussed below are based on a test case consisting of a rectangular 2D domain with constant pressure and no-flow conditions at the vertical and horizontal boundaries, respectively. For the discretisation, an equidistant Cartesian fine grid with 44×44 cells was used and in addition, for the i-MSFV method, a 4×4 coarse grid was employed (FIG. 6A). Since each coarse cell is composed of 11×11 line cells, the upscaling factor is 11 in each coordinate direction. For the following examples, homogeneous and heterogeneous mobility fields and domains with various aspect ratios $\alpha$ (horizontal to vertical dimension) are considered. The size of each fine cell is $\Delta x \times \Delta y$ with $\Delta x = 1 = \alpha \Delta y$. One skilled in the art will appreciate that a case with isotropic mobility and $\Delta x = \alpha \Delta y$ is numerically identical to a case with $\Delta x = \Delta y$ and a mobility which is larger by a factor of $\alpha^2$ in the y-direction.

The homogeneous examples with $\lambda_{ij} = \delta_{ij}$ also include a source with $q = 1/(\Delta x \Delta y)$ and a sink with $q = -1/(\Delta x \Delta y)$ distributed over the fine cells; the fine cells are depicted in black in FIG. 6A. For the heterogeneous cases, the mobility field that is depicted in FIG. 6B, which has a natural logarithm (ln) variance of 6.66 and mean of −0.29, was used. These cases are a part of the top layer of a three-dimensional SPE10 test case [M. A. Christie and M. J. Blunt. Tenth SPE comparative solution project: A comparison of upscaling techniques. SPE 66599, presented at The SPE Symposium on Reservoir Simulation, Houston, Tex., February, 2001].

Figure 7B:
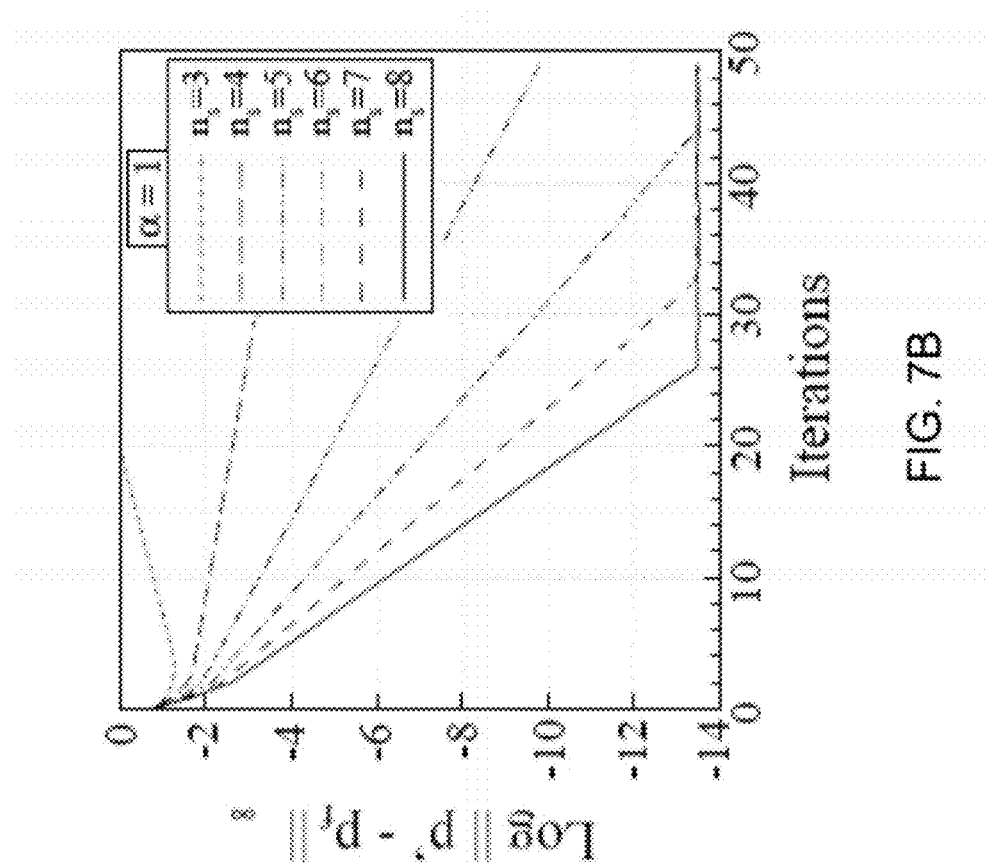
FIG. 7B is an illustration of numerical convergence histories in a heterogeneous isotropic domain.
Figure 7A:
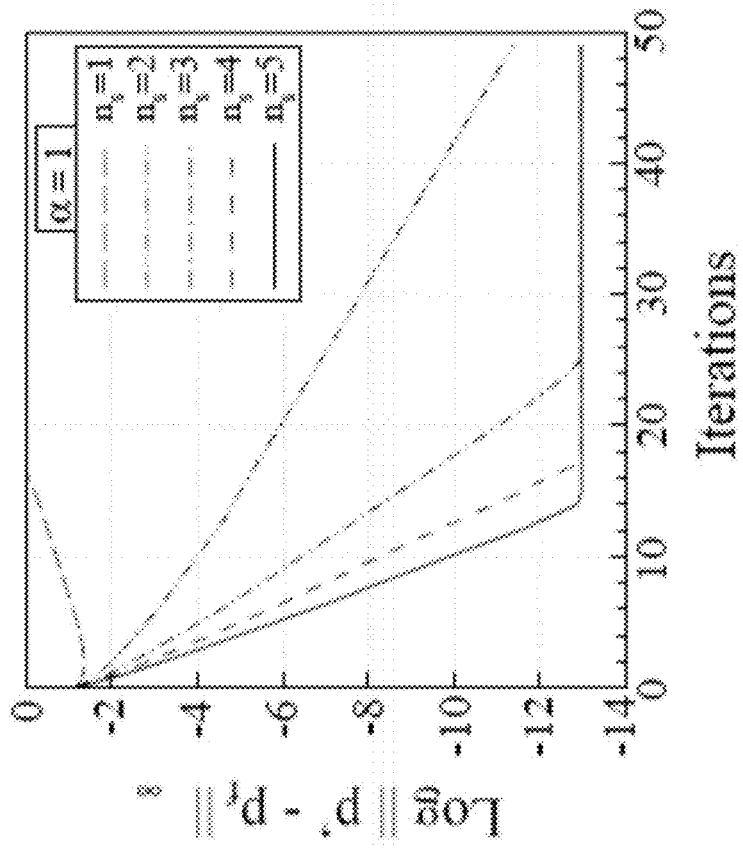
FIG. 7A is an illustration of numerical convergence histories in a homogeneous isotropic domain.
Figure 7D:
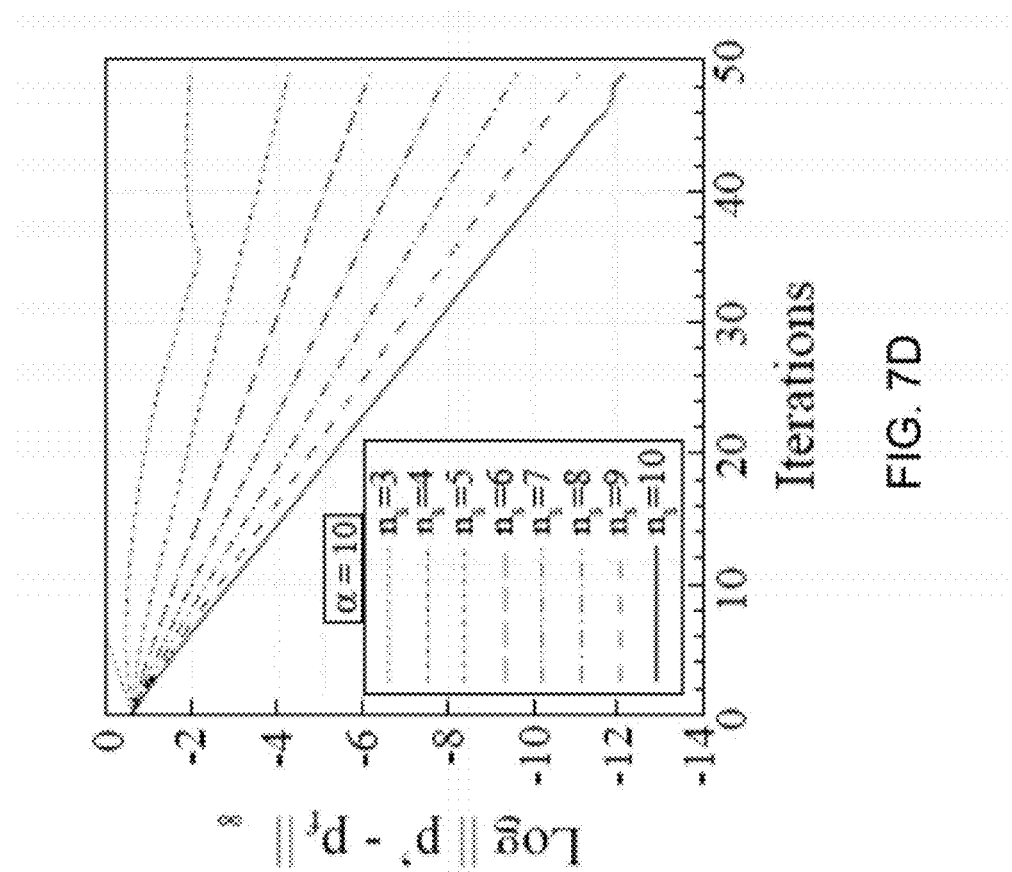
FIG. 7D is an illustration of numerical convergence histories in a heterogeneous anisotropic domain.
Figure 7C:
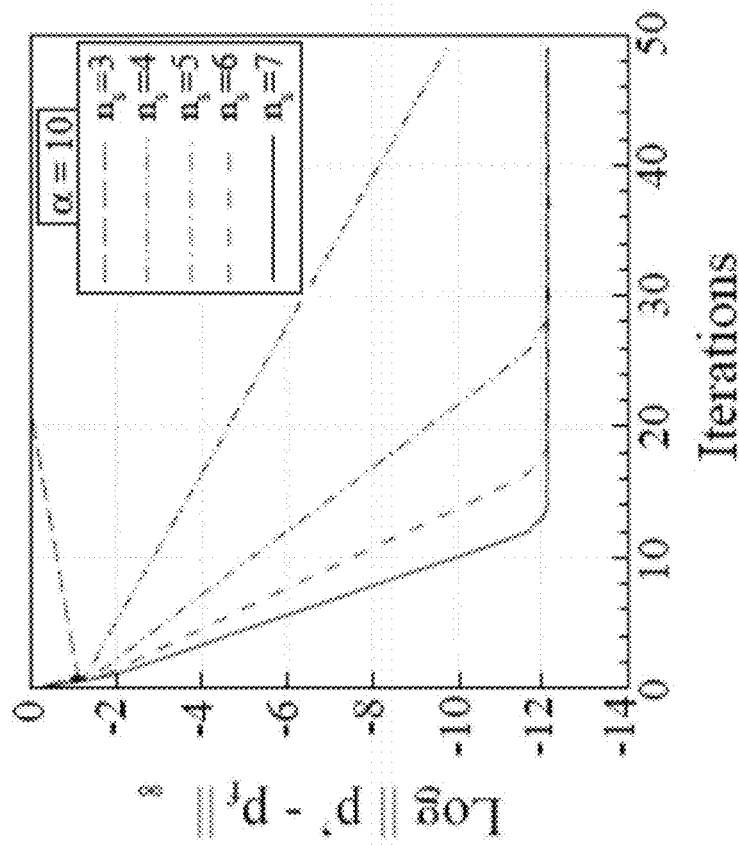
FIG. 7C is an illustration of numerical convergence histories in a homogeneous anisotropic domain.

FIG. 7 shows the base-10 logarithm (log) of the maximum error in the domain, i.e. $\log(\epsilon)$ with $\epsilon = \|p' - p_f\|_\infty$, as a function of i-MSFV iterations and smoothing steps (per iteration), $n_s$, for the homogeneous (FIGS. 7A and 7C) and heterogeneous (FIGS. 7B and 7D) cases with $\alpha = 1$ (FIGS. 7A and 7B) and $\alpha = 10$ (FIGS. 7C and 7D). For the cases there exists a minimum $n_s$, for which the i-MSFV method converges. The best convergence can be observed for the homogeneous isotropic ($\alpha = 1$) case and the worst convergence for the heterogeneous case with $\alpha = 10$.

Figure 8B:
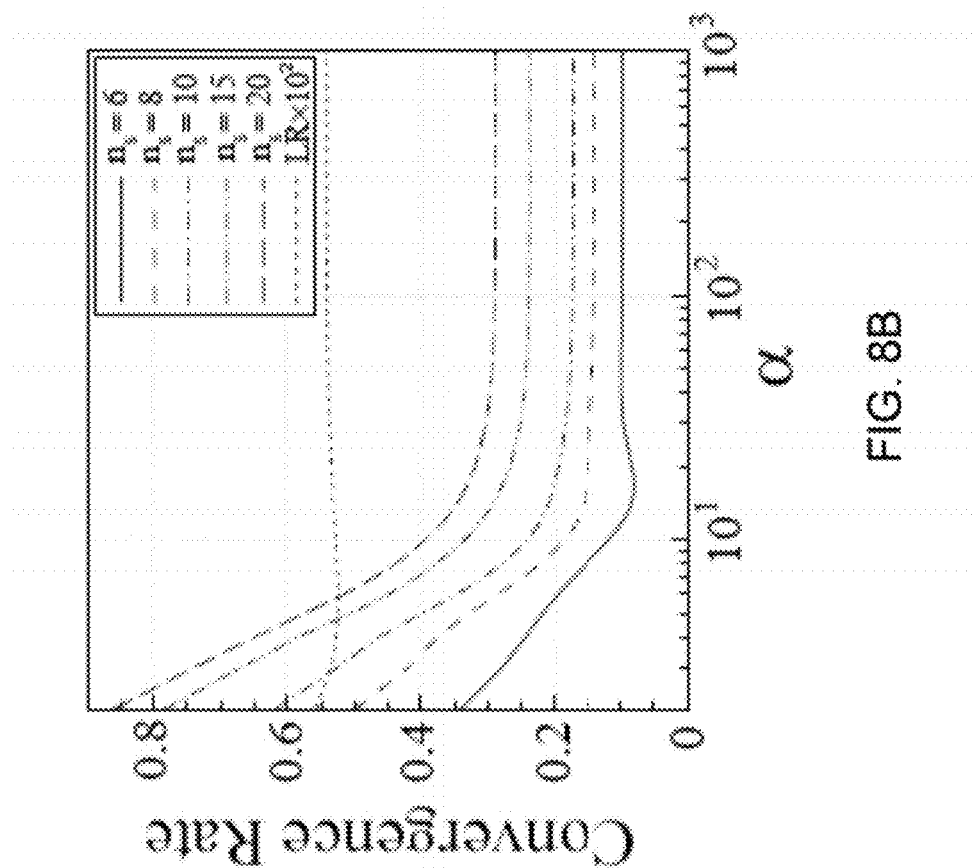
FIG. 8B is an illustration of convergence rates in a heterogeneous domain for $n_s$ as a function of aspect ratio.
Figure 8A:
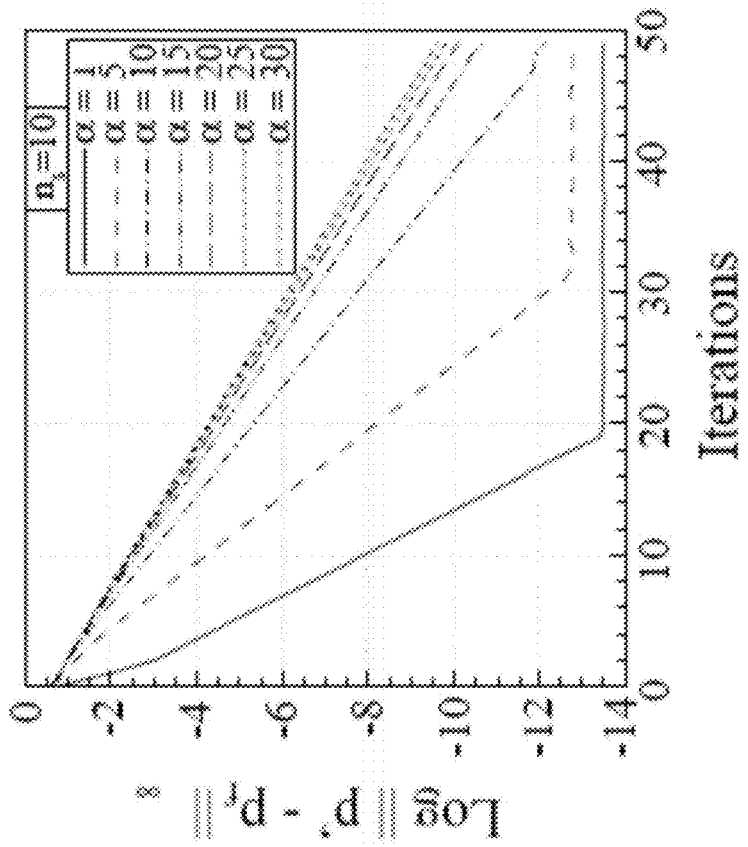
FIG. 8A is an illustration of convergence histories in a heterogeneous domain for $n_s=10$ and various aspect ratios.

FIG. 8A shows the convergence histories for the heterogeneous test case as a function of $\alpha$ with $n_s = 10$. The slope decreases as $\alpha$ increases, but eventually it approaches an asymptotic value. This observation is confirmed by the plot in FIG. 8B, which shows the convergence rate (average slope between $\log(\epsilon) = -2$ and $\log(\epsilon) = -8$) as a function of $\alpha$ and $n_s$ for the heterogeneous case. For $\alpha \geq 20$, the convergence dependence on the aspect ratio becomes negligible. This demonstrates that the i-MSFV method can be applied for cases with very large aspect ratios and/or extreme anisotropies. For comparison, the convergence rates (multiplied with 100) are also shown for the line relaxation method, which can be employed as a smoother within the i-MSFV algorithm, shown in FIG. 8B.

Figure 9B:
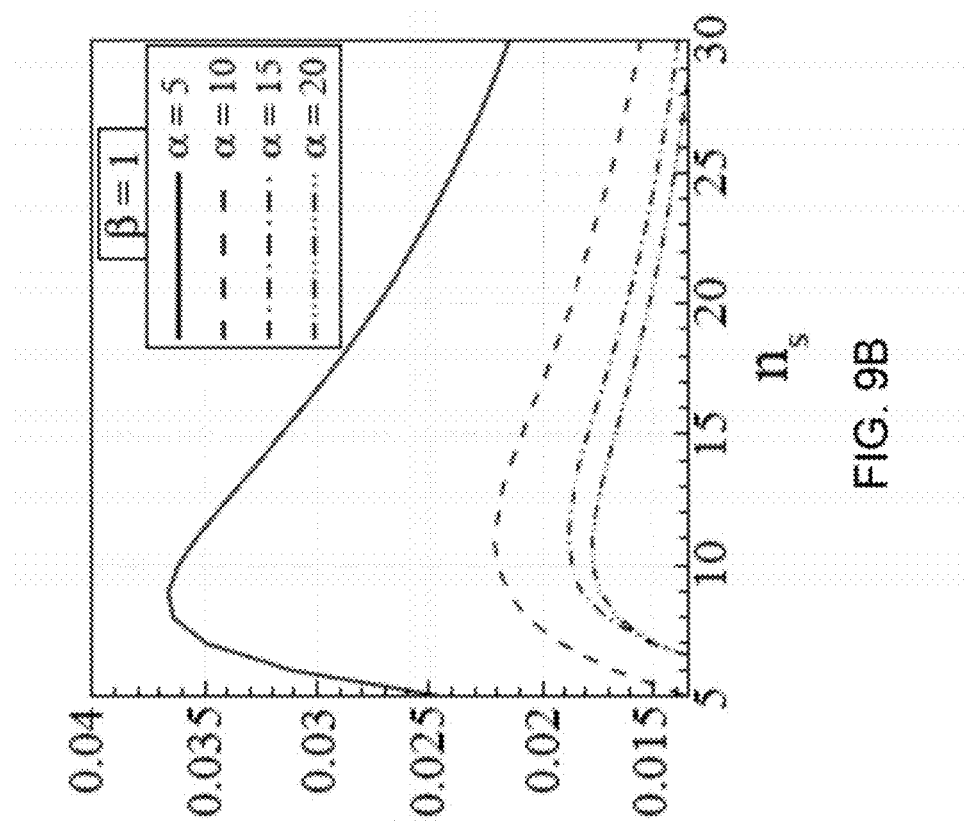
FIG. 9B is an illustration of effective convergence rates in a heterogeneous domain for various aspect ratios as a function of $n_s$.
Figure 9A:
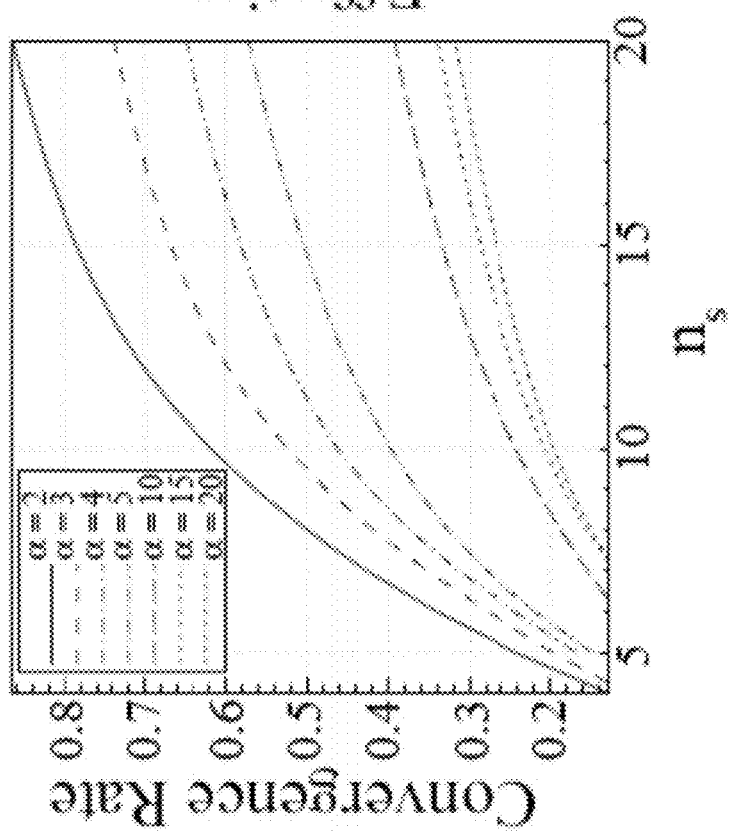
FIG. 9A is an illustration of convergence rates in a heterogeneous domain for various aspect ratios as a function of $n_s$.

FIG. 9A illustrates how the convergence rate increases with $n_s$. To estimate the optimal number of smoothing steps per iteration, the assumption is made that the amount of computational work to calculate the correction functions, to solve the coarse problem, and to reconstruct p' corresponds to $\beta$ times the computational work required for one smoothing step. This leads to the relation:

$$\text{Effective Convergence Rate} = \frac{\text{Convergence Rate}}{1 + n_s/\beta} \quad \text{(Equation 25)}$$

This can be a measure for the error reduction, if the computational work equivalent to one MSFV iteration (without smoothing nor reconstruction of a conservative velocity field) is invested. FIG. 9B shows the effective convergence rates for various aspect ratios $\alpha$ as functions of $n_s$, where $\beta$ is assumed to be one.

Figure 10:
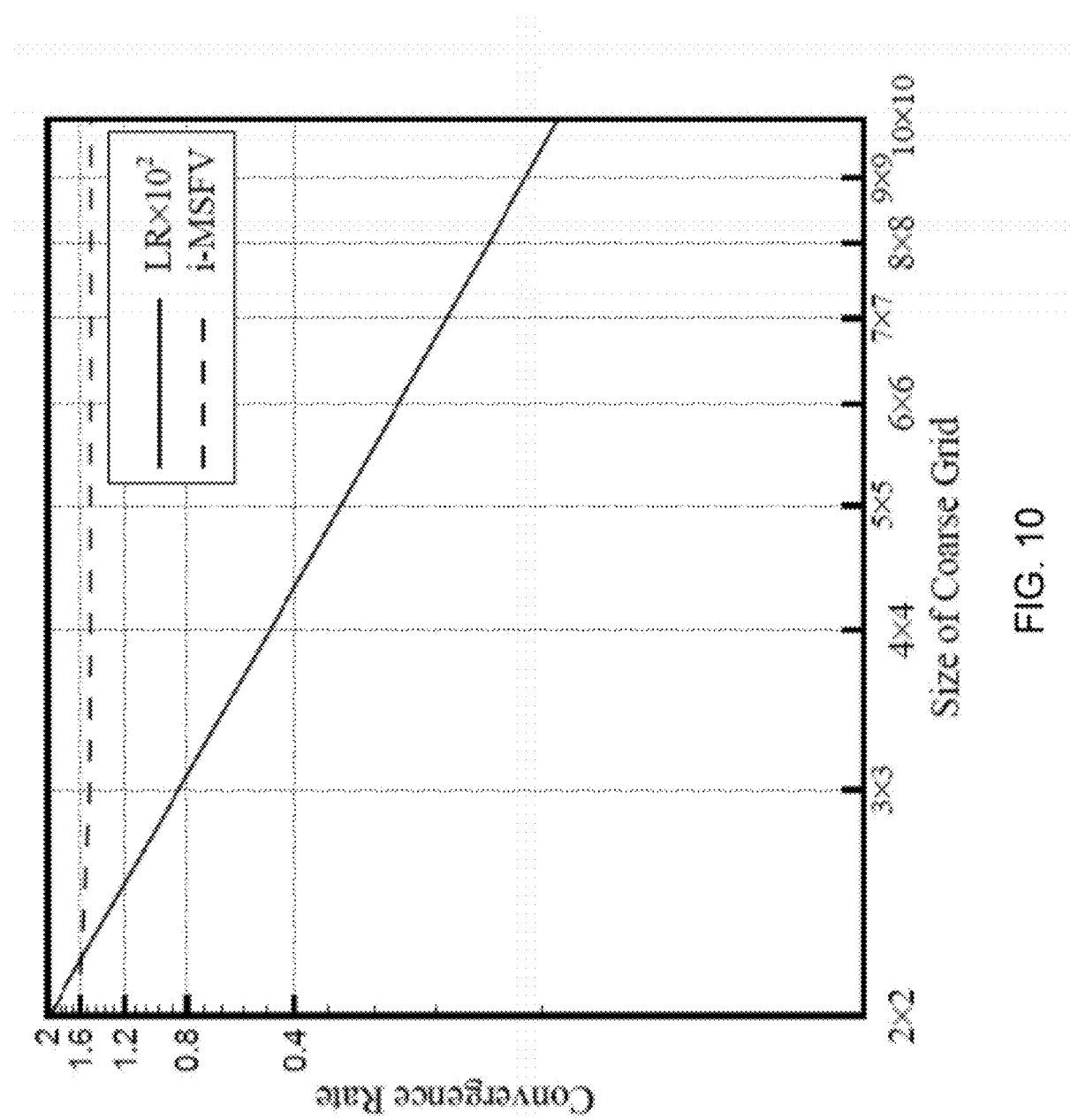
FIG. 10 is an illustration of convergence rates for various homogeneous-isotropic domain sizes.

To analyze the computational cost associated with the i-MSFV method as a function of the problem size, the number of fine cells in the homogeneous isotropic test case was increased successively by adding coarse-grid cells each comprised of 11×11 fine cells. FIG. 10 depicts the convergence rates for 2×2, 3×3, 4×4, 5×5, 6×6, 7×7, 8×8, 9×9, and 10×10 coarse grids. The log-log plot shows that the convergence rate (for constant $n_s = 10$) for the i-MSFV method, which is indicated by a dashed line, can be insensitive to the fine-grid size in comparison to the convergence rate of the line relaxation solver, which is indicated by a solid line. Moreover, calculation steps in the i-MSFV algorithm, other than solving the global coarse-scale problem, can be performed locally and independently. Therefore, since up to very large cases the cost for solving the coarse system can be virtually negligible, the i-MSFV method can be a very efficient linear solver for large, stiff problems, and it can be used for massive parallel computing which can be employed in the field of reservoir simulation.

Another parameter of interest is the upscaling factor. FIGS. 11A-B show the convergence rate for the heterogeneous case with upscaling factors $\Gamma$ of 11×11, 7×7, and 5×5. In FIG. 11A, the convergence rates are shown as functions of $\alpha$ with constant $n_s = 10$ and in FIG. 11B, they are depicted as functions of $n_s$ with constant $\alpha = 5$. One skilled in the art will appreciate that the optimal choice of $\Gamma$ depends on the size of the fine grid and on the computational cost of the individual algorithmic components. Therefore, the optimal choice of $\Gamma$ depends highly upon the coarse-scale solver.

Figure 12D:
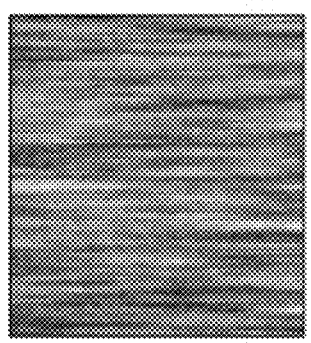
FIGS. 12A-12D are schematic views of a 2D domain showing a mobility field for various angles.
Figure 12C:
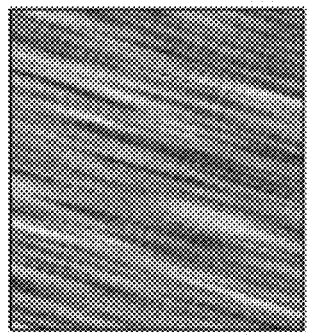
Figure 12B:
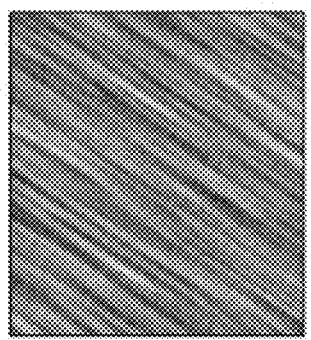
Figure 12A:
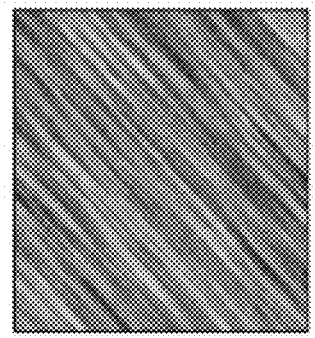
Figure 13:
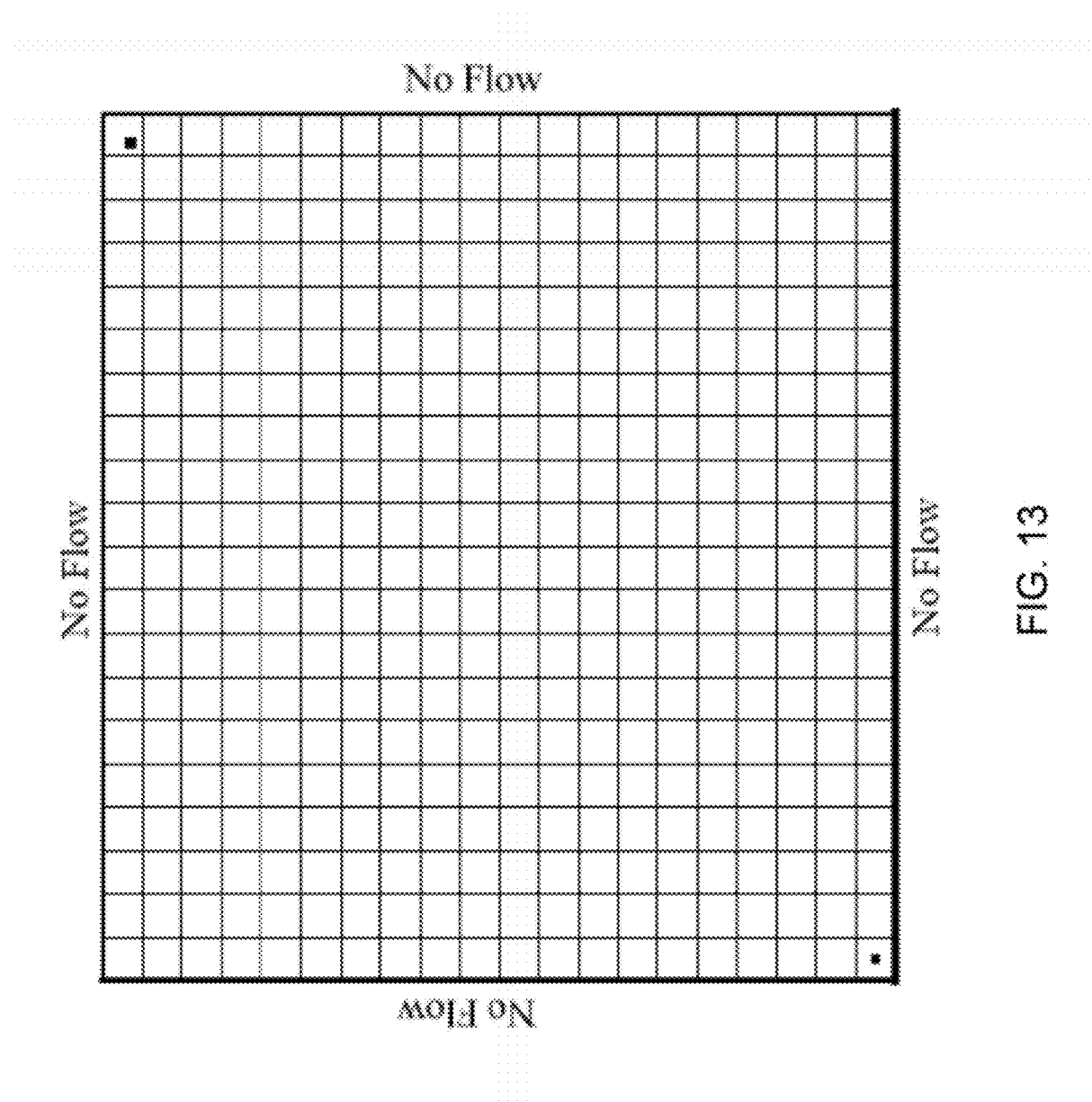
FIG. 13 is a schematic view of a 2D domain showing wells having a source and sink of strength $q=\pm 1/(\Delta x \Delta y)$.
Figure 14A:
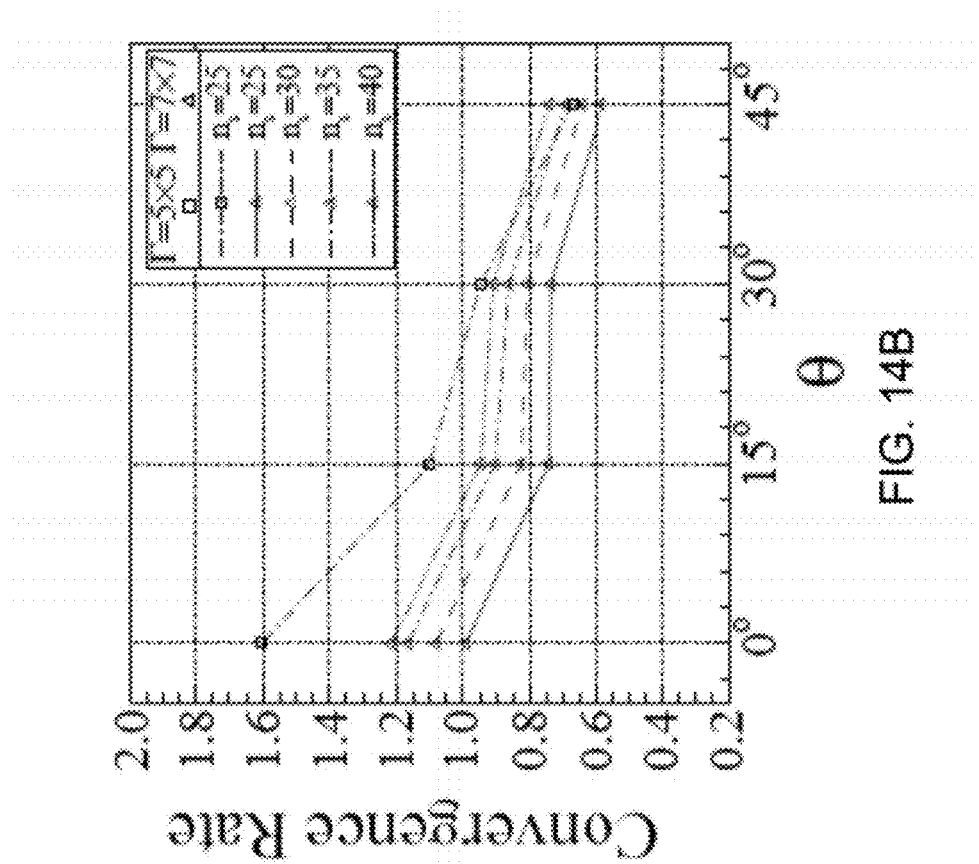
FIG. 14A is an illustration of convergence rates in a domain for various aspect ratios and smoothing steps.
Figure 14B:
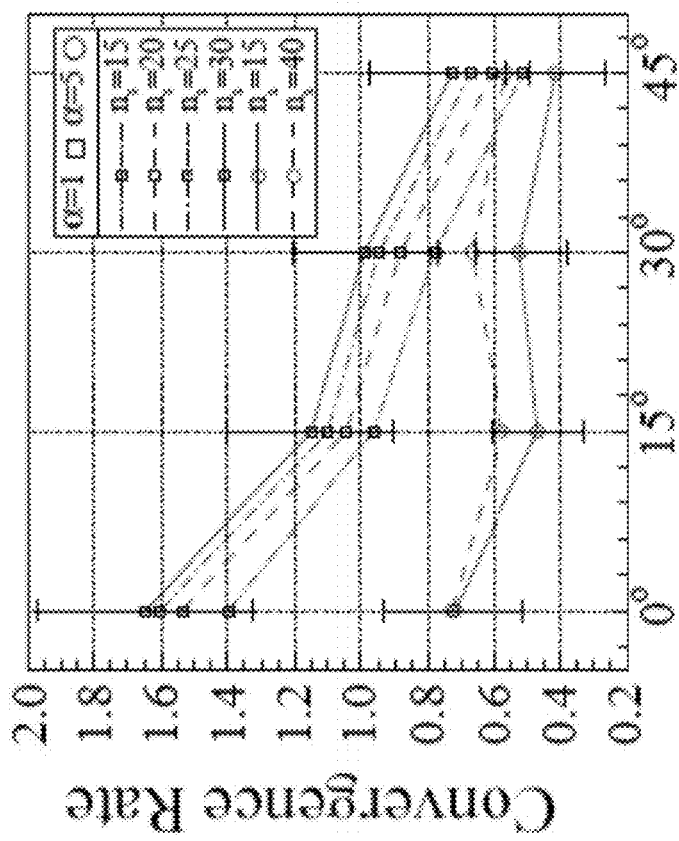
FIG. 14B is an illustration of convergence rates in a domain for various upscaling factors and smoothing steps.

Four sets of 20 realizations of log-normally distributed mobility fields with spherical variogram and dimensionless correlation lengths $\psi_1 = 0.5$ and $\psi_2 = 0.02$ are generated using sequential Gaussian simulations. For each set, variance and mean of $\ln(\lambda)$ are 2.0 and 3.0, respectively. As depicted in FIG. 12, the angles $\theta$ between the long correlation length and vertical domain boundaries (or vertical grid lines orientation) are 0° (FIG. 12A), 15° (FIG. 12B), 30° (FIG. 12C), and 45° (FIG. 12D). For each case, a 100×100 fine grid and a 20×20 coarse grid was employed. At the boundaries of the quadratic domain, no-flow conditions were applied and at the lower left and upper right corners (cells (3,3) and (97,97)), a source and a sink of equal strength ($q = \pm 1/(\Delta x \Delta y)$) were imposed; these cells are indicated by a black dot in FIG. 13. FIGS. 14A and 14B show the mean convergence rates as functions of $\theta$ for various $n_s$, $\alpha$, $\Gamma$. For example, FIG. 14A depicts $\alpha = 1$ and $\alpha = 5$ and FIG. 14B depicts a 5×5 and 7×7 upscaling factor. As shown in FIGS. 14A and 14B, there can be a significant difference in the convergence rates. However, in general, the convergence rate can decrease with increasing layering orientation angle $\theta$.

Regarding spectral analysis of the i-MSFV method, the following are discussed. The convergence assessment of the i-MSFV method may also be observed by analyzing the spectrum of the associated iteration matrix, i.e., according to Equation (20), of $A^{*(n_s)}$ in $$p'^{(i)}_s = A^{*(n_s)} \cdot p'^{(i+1)}_s + b^* \quad \text{(Equation 26)}$$

The iteration procedure converges if eigenvalues of $A^{*(n_s)}$ within the unit-disc of the complex plane.

Various spectra of $A^{*(n_s)}$ for the homogeneous anisotropic test case with no flow conditions at all boundaries are depicted in FIGS. 15A-15D. Fine and coarse grids consist of 44×44 and 4×4 cells, respectively, and FIGS. 15A-15D refer to iteration matrices based on various $n_s$. In particular, FIG.

Figure 15A:
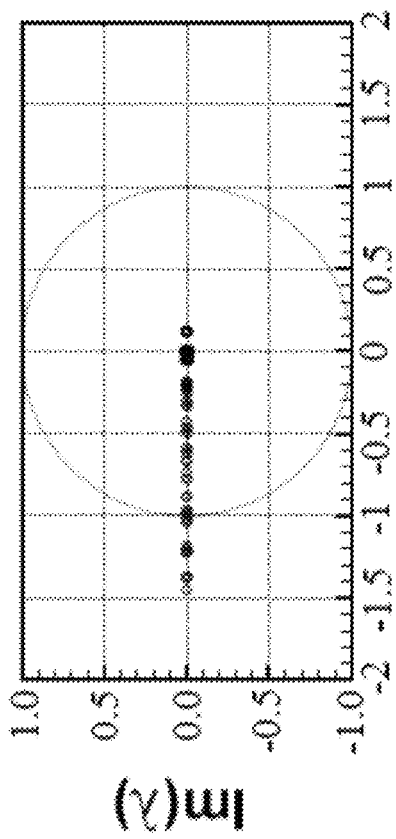
FIGS. 15A-15D are illustrations of spectra in a homogeneous-isotropic domain for no-flow boundary conditions and various values of $n_s$.
Figure 15B:
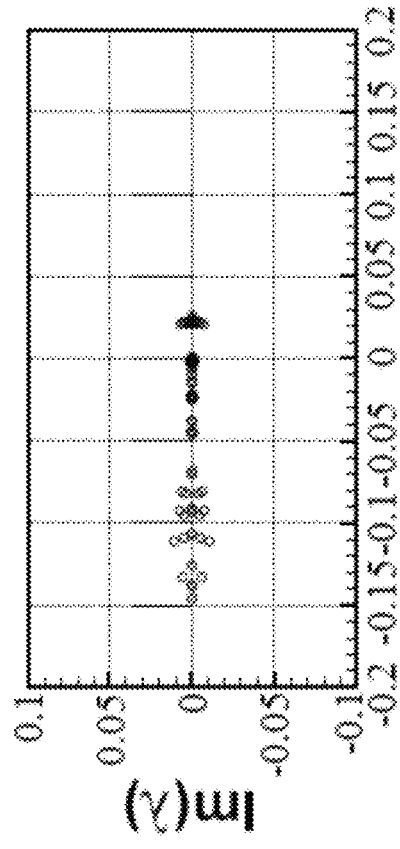
Figure 15C:
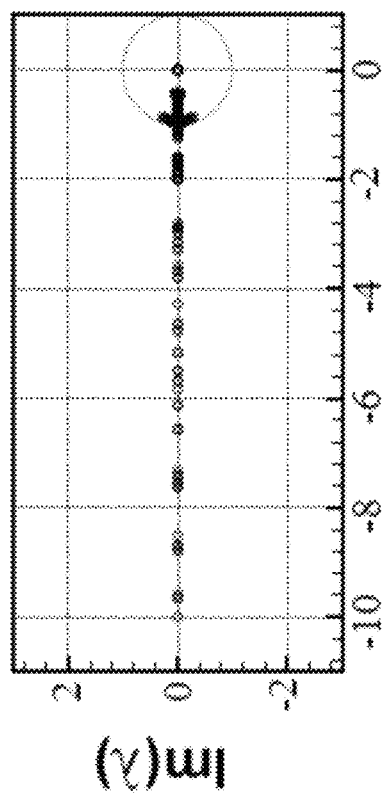
Figure 15D:
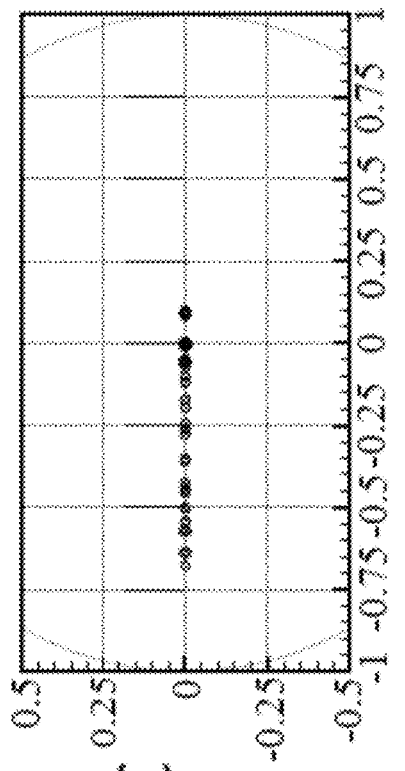

15A is for $n_s=0$, FIG. 15B is for $n_s=1$, FIG. 15C is for $n_s=2$, and FIG. 15D is for $n_s=5$. These results confirm those presented in FIG. 7A, such that at least two smoothing steps may be required for convergence of the homogeneous-isotropic case. It is noted that, unlike the matrix M of the fine-scale problem of Equation (21), $A*^{(n_s)}$ is not symmetric and possesses non-real eigenvalues. Eigenvalues of $A*^{(n_s)}$ are clustered around the negative real axis, which implies that the approximate solution at successive iteration steps oscillates around the exact one.

Figure 16B:
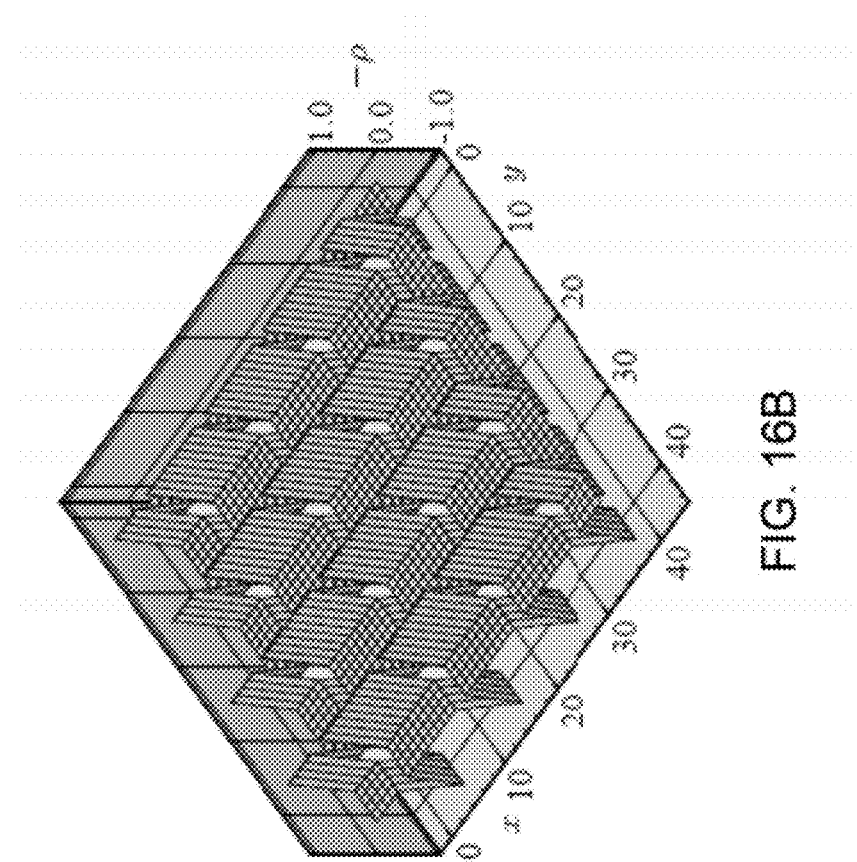
FIG. 16B is an illustration of corresponding residuum of the spectra shown in FIG. 15A.
Figure 16A:
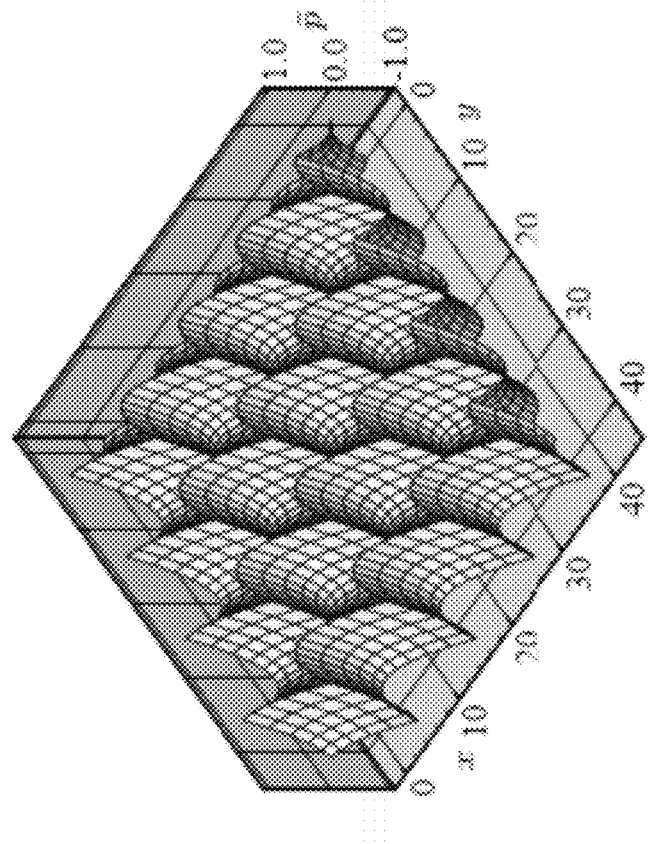
FIG. 16A is an illustration of eigenvectors with the largest eigenvalues of the spectra shown in FIG. 15A.
Figure 16D:
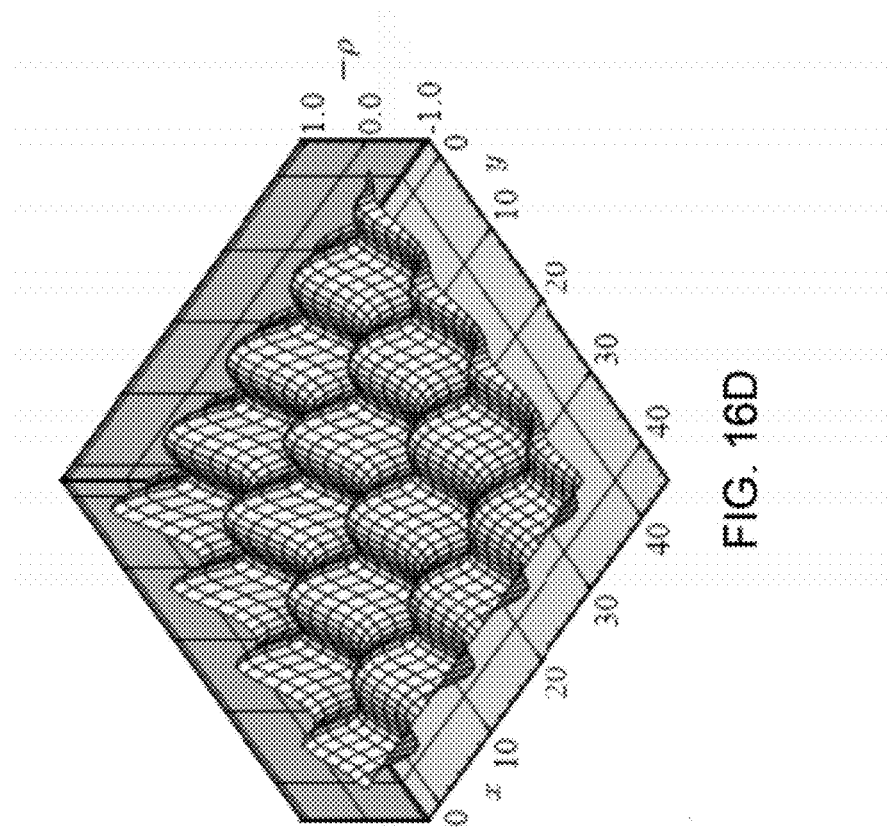
FIG. 16D is an illustration of corresponding residuum of the spectra shown in FIG. 15C.
Figure 16C:
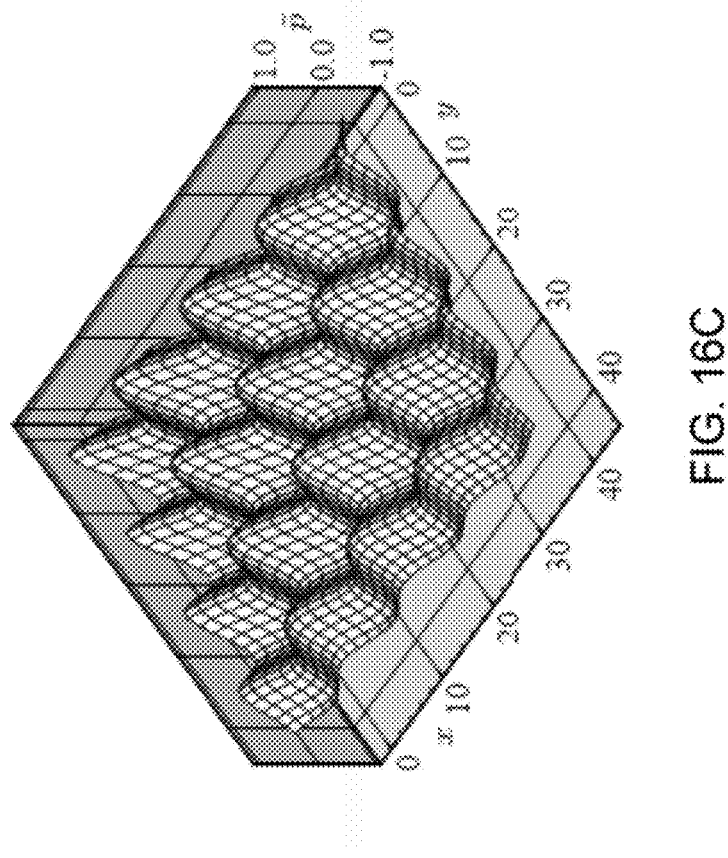
FIG. 16C is an illustration of eigenvectors with the largest eigenvalues of the spectra shown in FIG. 15C.

The eigenfunctions $\tilde{p}$ associated with the largest eigenvalues are plotted in FIGS. 16A-D together with the corresponding residuum $\rho = \nabla \cdot \lambda \cdot \nabla \tilde{p}$ in the discrete fulfillment of Equation (1) without right-hand side. FIG. 16A is an illustration of eigenvectors with the largest eigenvalues of the spectra shown in FIG. 15A. FIG. 16B is an illustration of corresponding residuum in the fulfillment of Equation 1 without the right hand side of the spectra shown in FIG. 15A. FIG. 16C is an illustration of eigenvectors with the largest eigenvalues of the spectra shown in FIG. 15C. FIG. 16D is an illustration of corresponding residuum in the fulfillment of Equation 1 without the right hand side of the spectra shown in FIG. 15C. Only the results for $n_s=0$ (unstable) and $n_s=2$ (stable) are shown. In both cases, the residuum is largest at the dual-cell boundaries and without smoothing it is zero everywhere else. This is in agreement with the fact that any non-smoothed solution $p'$ fulfills Equation (1) exactly inside the coarse dual cells. The smoothing steps efficiently redistribute the residuum and reduce its maximum amplitude. Consequently, the eigenvectors of $A*^{(n_s)}$ become amplified for $n_s=0$ and are damped for $n_s=2$.

Figure 17A:
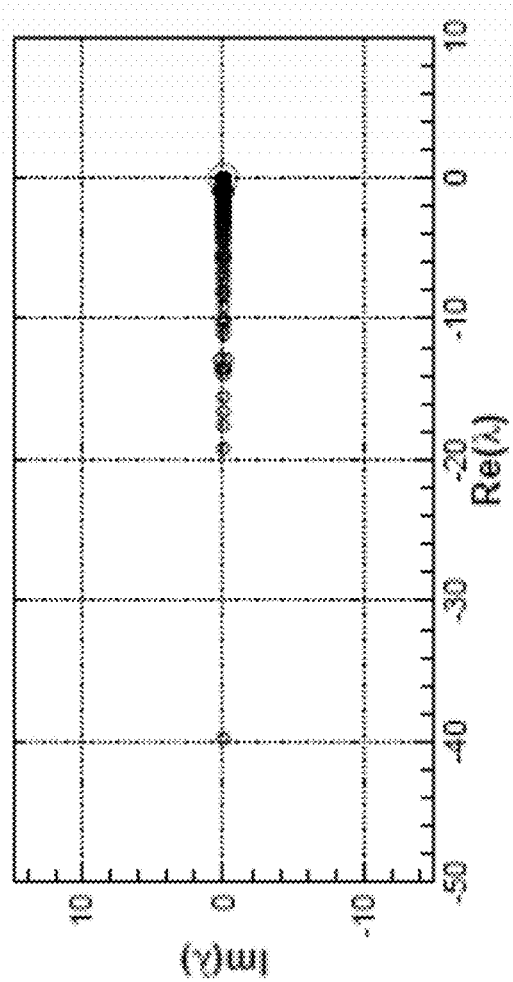
FIGS. 17A and 17B are illustrations of spectra in a heterogeneous-isotropic domain for no-flow boundary conditions and various values of $n_s$.
Figure 17B:
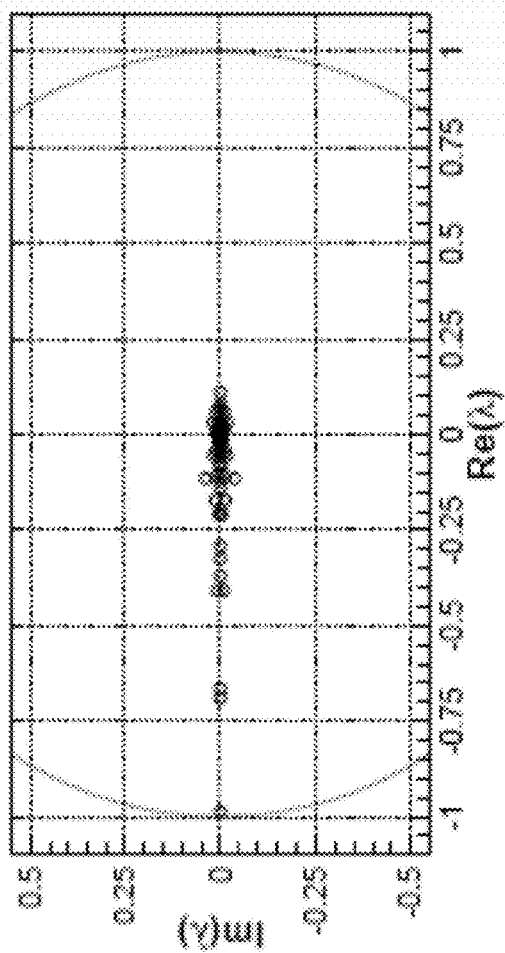
Figure 18B:
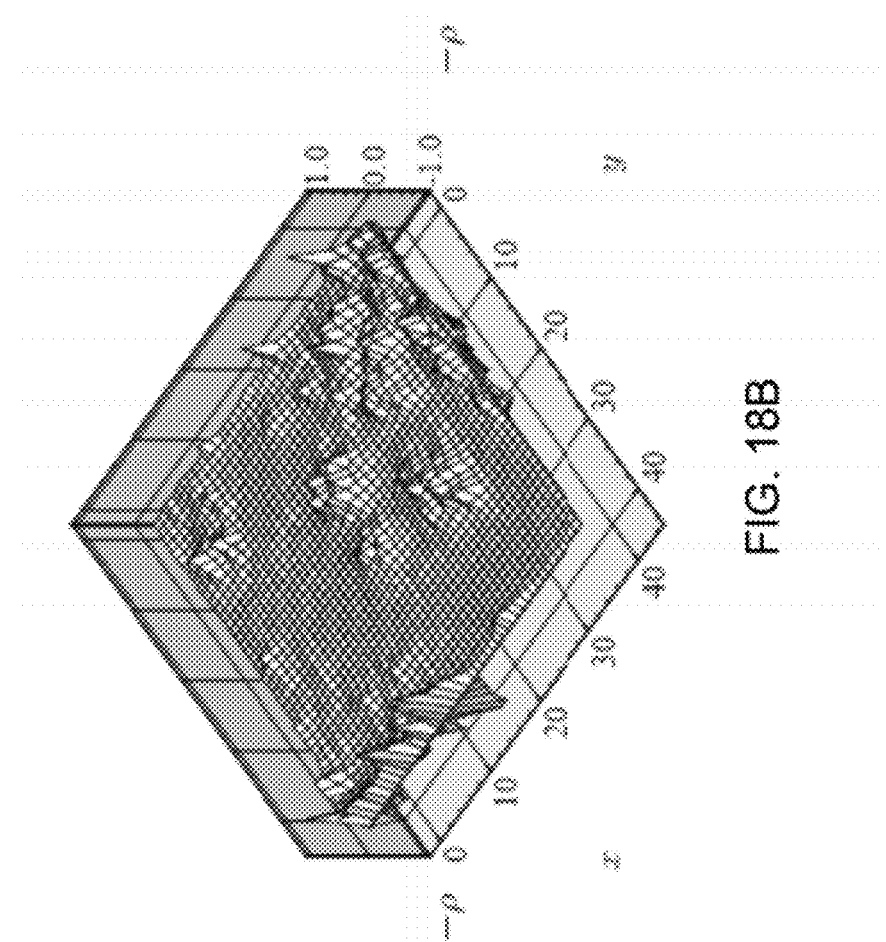
FIG. 18B is an illustration of corresponding residuum for eigenvectors with the ten largest eigenvalues of the spectra shown in FIG. 16B.
Figure 18A:
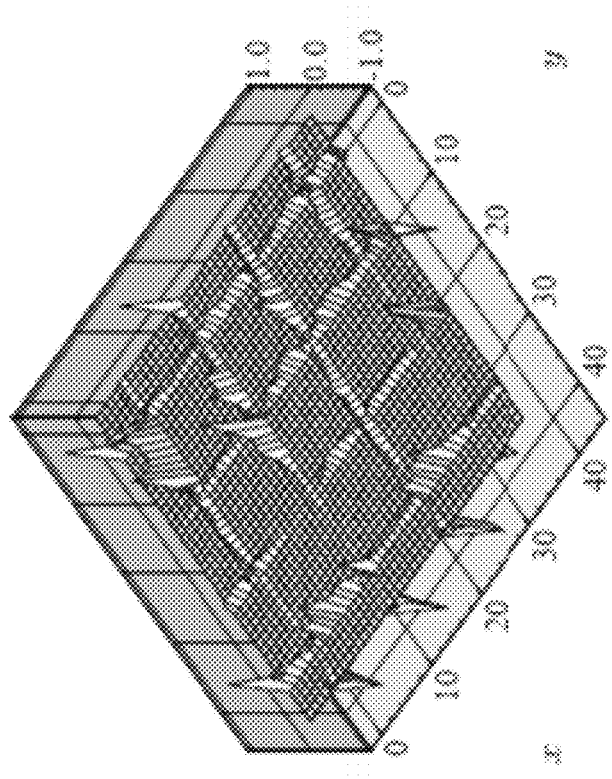
FIG. 18A is an illustration of corresponding residuum for eigenvectors with the ten largest eigenvalues of the spectra shown in FIG. 16A.
Figure 19B:
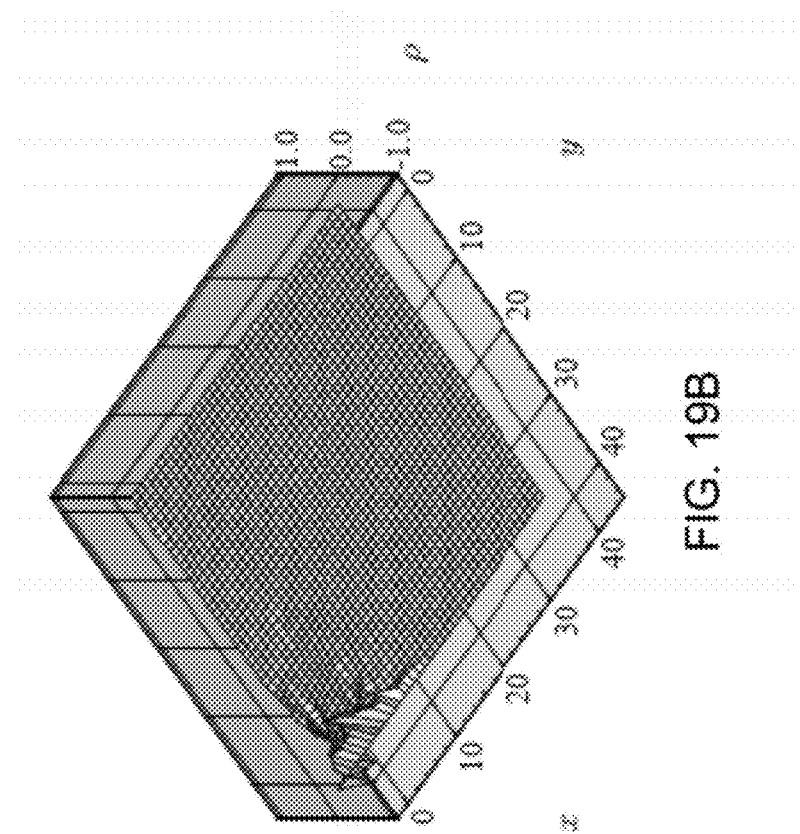
FIG. 19B is an illustration of the corresponding residuum of the spectra shown in FIG. 17A.
Figure 19A:
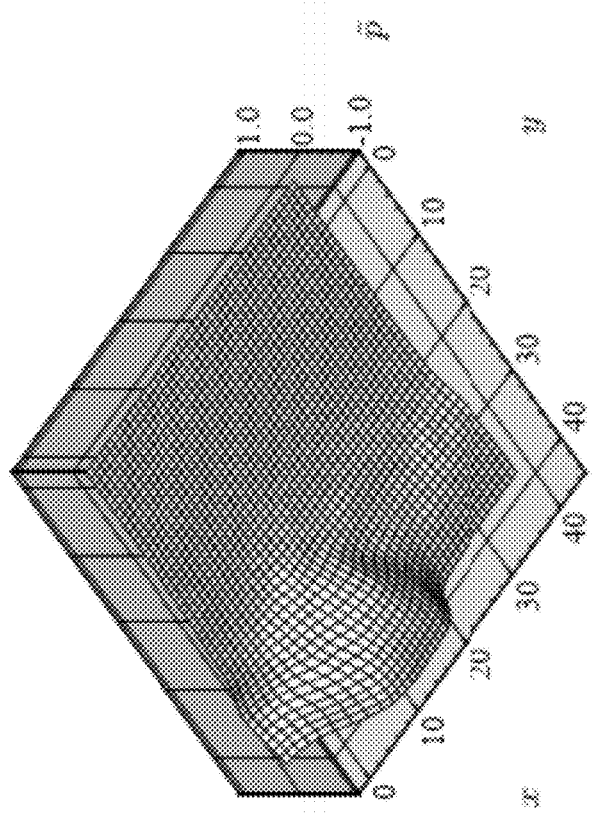
FIG. 19A is an illustration of the eigenvector with the largest eigenvalue of the spectra shown in FIG. 17A.

In FIGS. 17A and 17B, spectra of the iteration matrix $A*^{(n_s)}$ can be observed for cases with heterogeneous isotropic mobility fields with no flow boundary conditions. Again, fine and coarse grids consist of 44×44 and 4×4 cells, respectively. FIG. 17A is for $n_s=0$ and FIG. 17B is for $n_s=5$. In FIGS. 18A and 18B, the largest values of the residua associated with the ten least stable eigenvectors for $n_s=0$ and $n_s=5$, respectively, are presented. Notice the discontinuous distribution in FIG. 18A for the case with $n_s=0$. The residuum gets distributed by the $n_s=5$ smoothing steps (FIG. 18B). Finally, FIGS. 19A and 19B depict the least stable eigenvector for $n_s=5$ and its residuum.

Following is a discussion of application to subsurface flow. In typical incompressible subsurface reservoir flow simulations, the pressure in the porous media is governed by Equation (1). As in the examples herein, the mobility $\lambda$ typically has a complex distribution with high variance and sharp contrasts. It can be a function of the rock permeability k, the fluid phase saturations and the fluid viscosities. For single-phase flow of a fluid with viscosity $\mu$ one can write $\lambda = k/\mu$. The expression for multiphase flow can be based on the relative permeability concept and can be expressed as $$\lambda = k \sum_{j=1}^{n_p} k_{r_j}/\mu_j$$

(where $n_p$ is the number of fluid phases). The relative permeabilities $k_{r_j}$ can be specified for each fluid phase j as functions of the saturations. While $\lambda$ does not change with time in single-phase flow simulations, it evolves if multiple fluid phases are transported through the reservoir. For the following examples, the right-hand side of Equation (1) is non-zero only at the well. Therefore, no capillary pressure difference between the fluid phases and no gravity are considered.

Figure 21A:
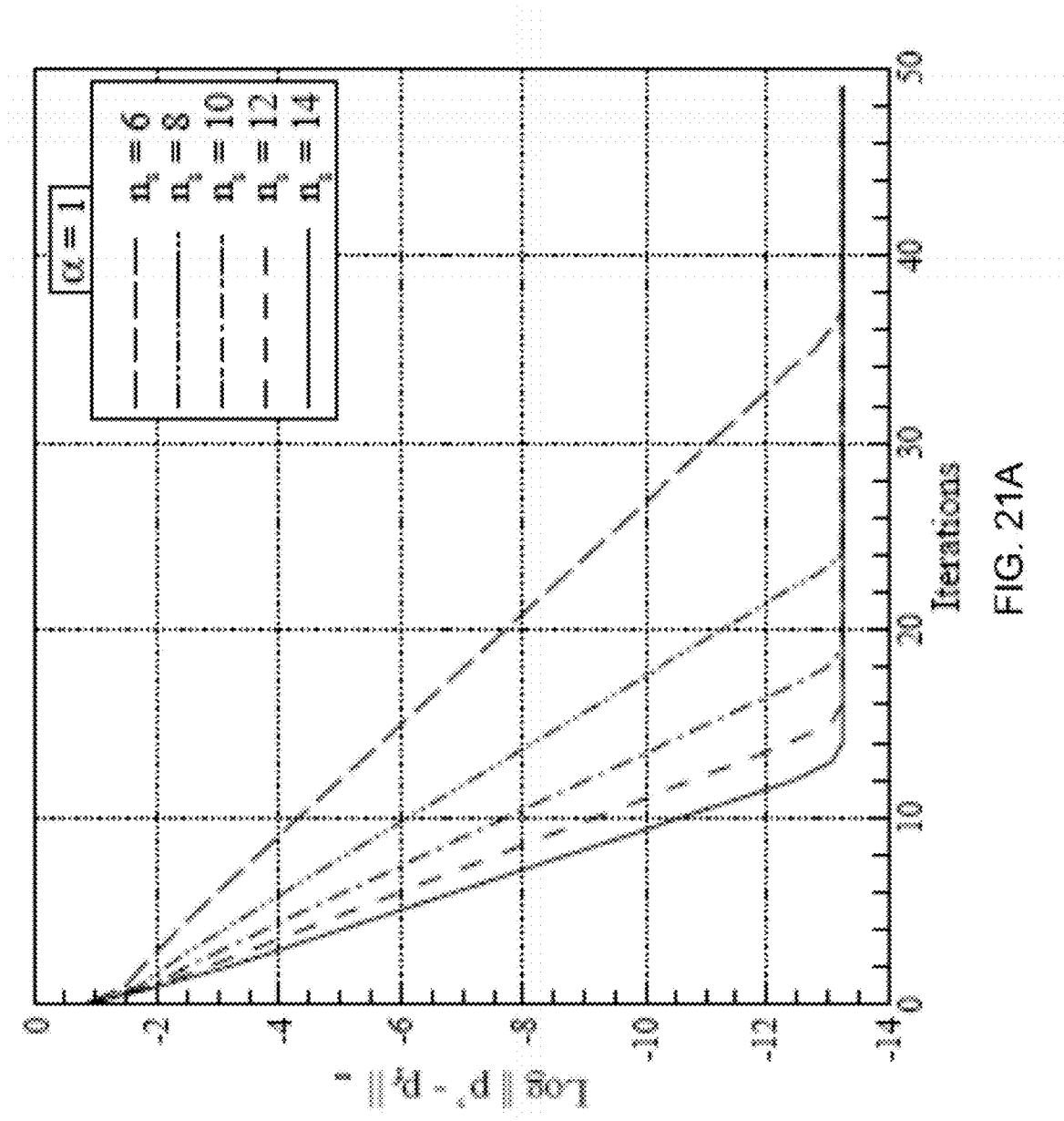
FIGS. 21A and 21B are illustrations of convergence histories of the permeability fields shown in FIGS. 20A and 20B.
Figure 21B:
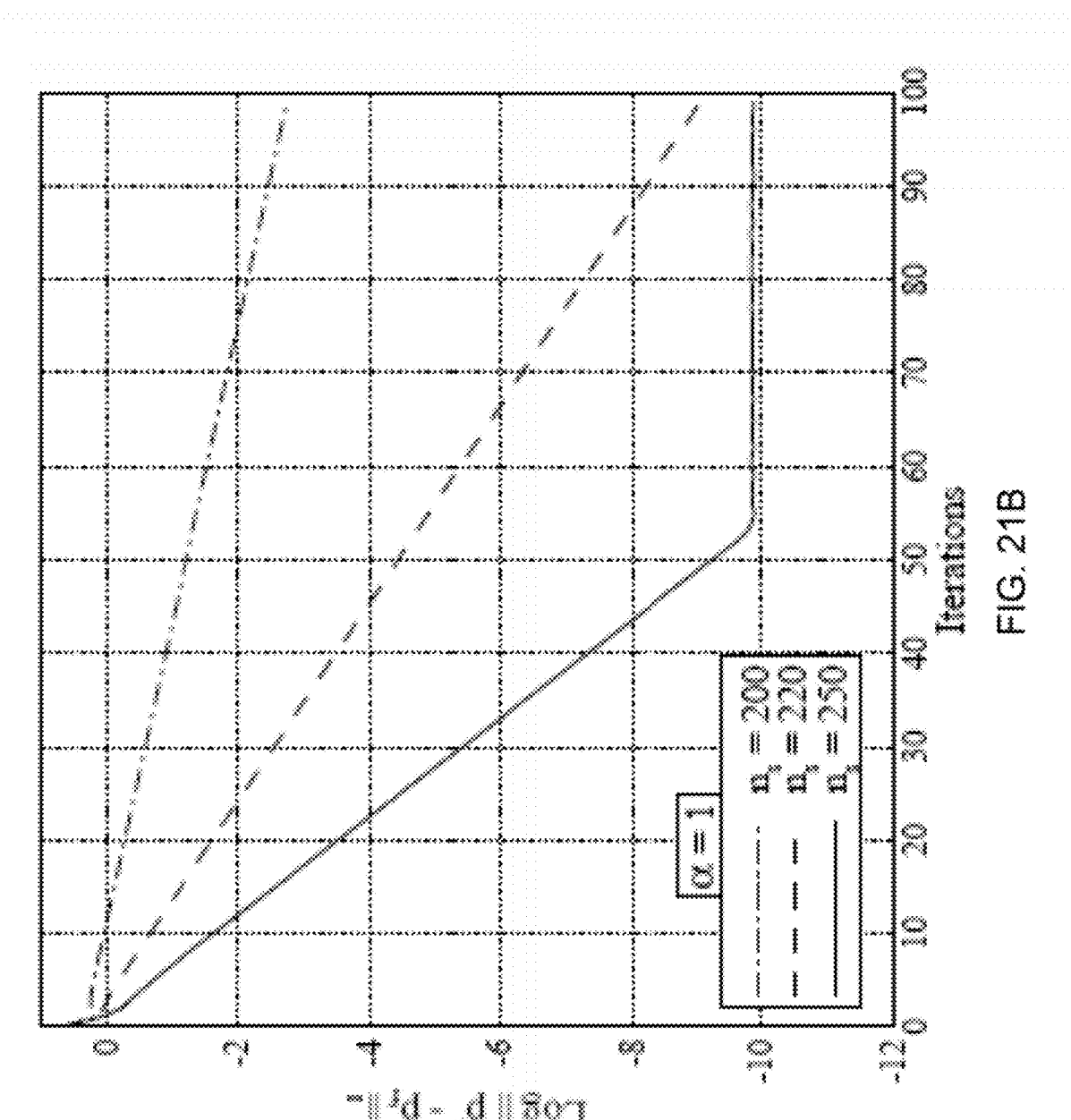
Figure 22:
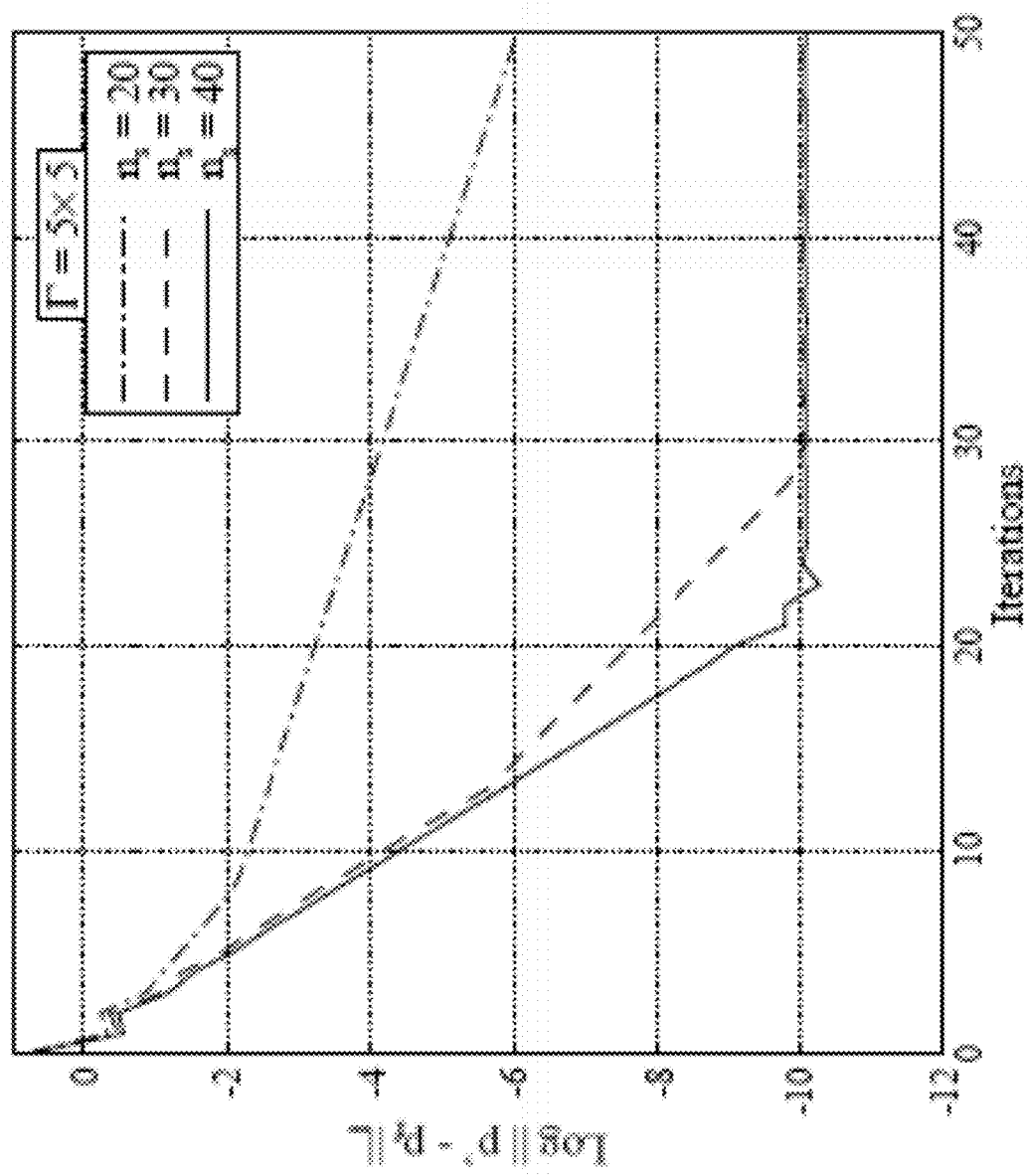
FIG. 22 is an illustration of convergence histories of the permeability fields shown in FIG. 20B.

Regarding single-phase flow, the following are discussed. The convergence behavior of the i-MSFV method for single-phase flow in particularly challenging reservoirs can be investigated in the following examples. The rectangular 2D domain can be discretized by a Cartesian, equidistant 220×55 fine-scale grid. No-flow conditions are applied at the bottom and top walls; at the left and right boundaries constant dimensionless pressure values of 1 and 0 are applied, respectively. Permeability fields from the top and bottom layers of the 3D SPE 10 test case are shown in FIGS. 20A and 20B and the corresponding convergence histories for the permeability fields are shown in FIGS. 21A and 21B, respectively, where a 20×5 coarse grid was employed. As with previous examples, the error can be defined as the logarithm of the maximum absolute difference between the approximate i-MSFV and the reference fine-scale pressure values. While for the top layer a good convergence rate can be achieved with $n_s=10$ (FIG. 21A), approximately 250 smoothing steps can be applied for optimal convergence with the bottom layer permeability field (FIG. 21B). However, in this example, many more smoothing steps can be applied if line relaxation is employed as an iterative linear solver (~$10^5$ iterations can be performed to reduce the error by five orders of magnitude). Moreover, FIG. 22 illustrates that the number of smoothing steps can be reduced dramatically, if a coarsening factor of $\Gamma=5\times5$ (and fine grid of 220×60) instead of $\Gamma=11\times11$ (and fine grid of 220×55) is employed.

Figure 23A:
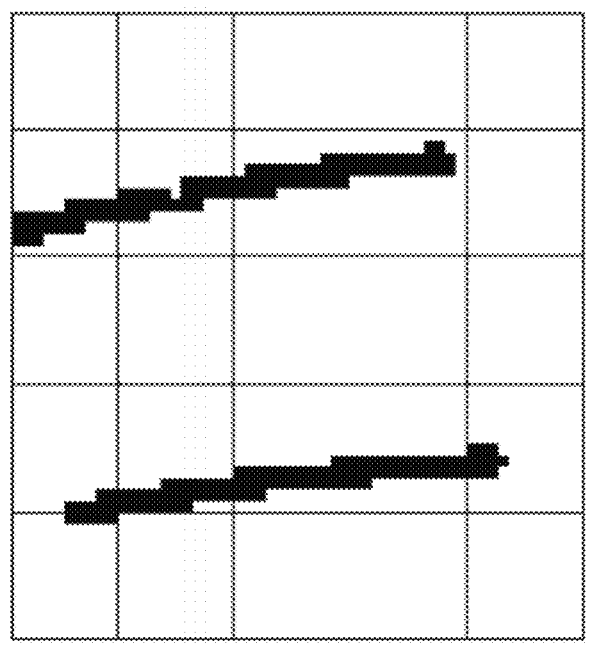
FIG. 23A is an illustration of a domain having two almost impermeable shale layers.
Figure 23B:
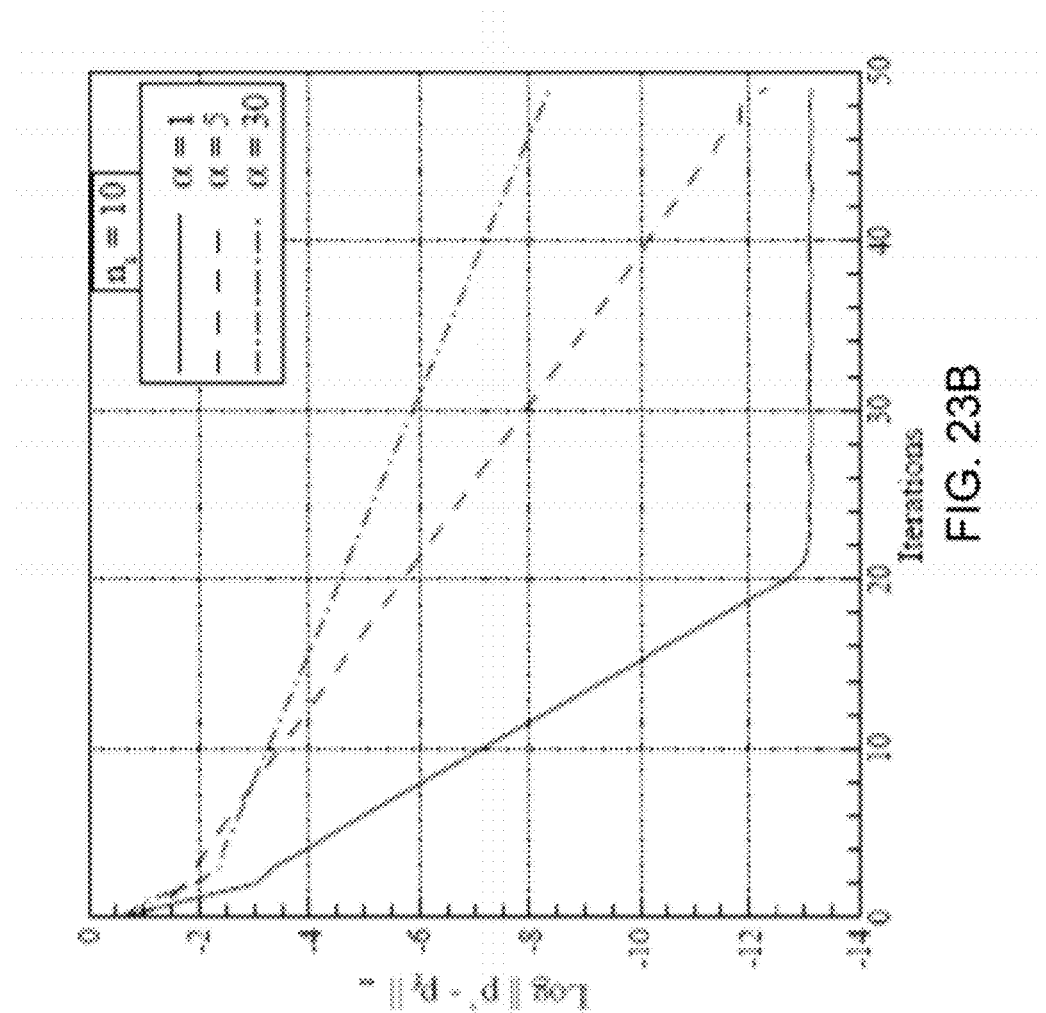
FIG. 23B is an illustration of convergence histories of the permeability field of the domain shown in FIG. 23A.

As a further example, a rectangular domain with two almost impermeable shale layers is considered (FIG. 23A); the mobility in the shale layers is $10^{10}$ times smaller than in the rest of the domain. The equidistant Cartesian fine grid consists of 55×55 cells and the coarse grid for the i-MSFV method contains 5×5 volumes. Again, no-flow conditions are applied at the bottom and top boundaries and at the left and right sides the dimensionless pressure values are set equal to 1 and 0, respectively. FIG. 23B shows the convergence histories with $n_s=10$ for various aspect ratios.

Regarding multi-phase flow, the following are discussed. As already pointed out, in multiphase flow simulations the mobility $\lambda$ and therefore the pressure field evolve with time as the phase saturations are transported through the domain. One skilled in the art will recognize that this also affects the localization boundary conditions, which continuously experience changes in the whole domain even where the mobility remains constant. Consequently, in a straight forward application of the i-MSFV method for multiphase flow, correction functions can be re-computed multiple times for each time-step. Although the number of i-MSFV iterations can be reduced by the good initial condition obtained from the previous time step, such an approach can be more expensive than the original MSFV method. However, infrequently updating the localization boundary conditions for the re-computation of the correction functions can be sufficient to obtain highly accurate solutions. While in this example a converged solution is computed at the beginning of a simulation, the same localization boundary conditions can be used for a number of subsequent time steps and can be updated infrequently, such as each tenth time step by applying a single iteration. Therefore, for the major part of the simulation, the original MSFV method with slightly modified correction functions can be employed and both basis and correction functions can be updated in regions where the total mobility changes are significant. The computational cost of this algorithm can be comparable with the one of the original MSFV method. However, the accuracy of the solutions can be improved dramatically.

Figure 25C:
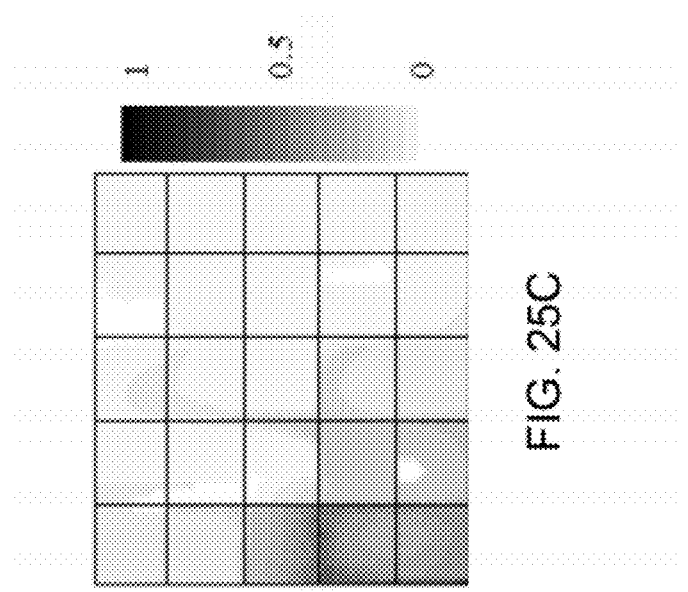
FIG. 25C is an illustration of the original multi-scale finite volume solution of a two-phase saturation map for a domain having two almost impermeable shale layers as shown in FIG. 23A.
Figure 25B:
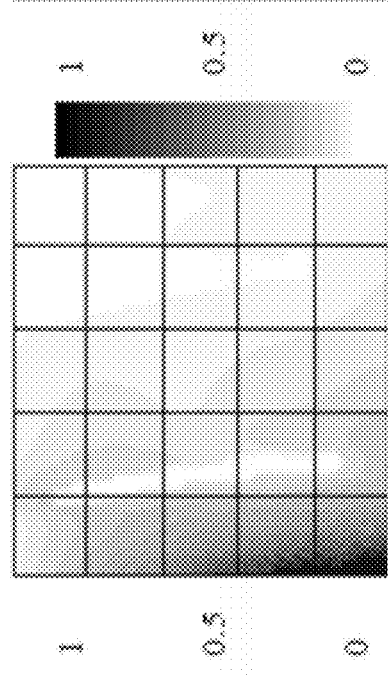
FIG. 25B is an illustration of the iterative multi-scale solution of a two-phase saturation map for a domain having two almost impermeable shale layers as shown in FIG. 23A.
Figure 25A:
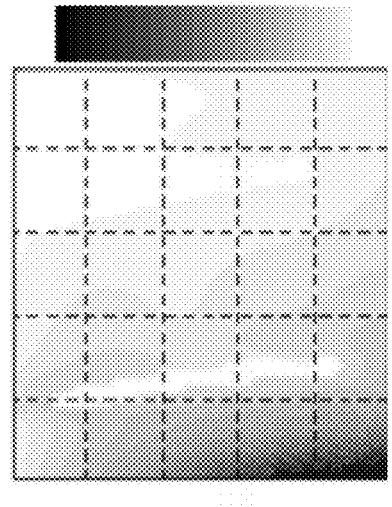
FIG. 25A is an illustration of the fine-scale reference solution of a two-phase saturation map for a domain having two almost impermeable shale layers as shown in FIG. 23A.

The i-MSFV method with infrequently updating the localization conditions is tested for two-phase flow scenarios with a viscosity ratio $\mu_2/\mu_1$ of 10. The relative permeability $k_{r_{1,2}} = S_{1,2}^2$ (where $S_{1,2}\epsilon[0,1]$ are the phase saturations) is used for the first example and $k_{r_{1,2}}=S_{1,2}$ is used for the second example. The permeability fields of FIGS. 20A and 23A are employed and the rectangular domains are discretized by 220×55 and 55×55 fine grids, respectively. In both examples, coarse grids consisting of volumes containing 11×11 line cells with an aspect ratio of 10 are used and no-flow conditions are applied at the whole domain boundary. Initially, the domains are saturated with a first viscous fluid and a less viscous fluid is injected into the fine cell (0, 0). In the first scenario, production occurs from cell (220, 55) and in the second scenario from cell (55, 55). For the numerical solution of the phase transport equation, an explicit scheme was employed. FIGS. 24 and 25 show the saturation maps for the two test cases after 0.165 pore volume injected (PVI). The i-MSFV method that updates the correction function boundary conditions every 10th time step (shown in FIGS. 24B and 25B) can lead to results that are virtually identical with the fine-scale reference solutions shown in FIGS. 24A and 25A. The MSFV solutions that are shown in 23C and 24C of show significant deviations from the reference.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

Figure 26:
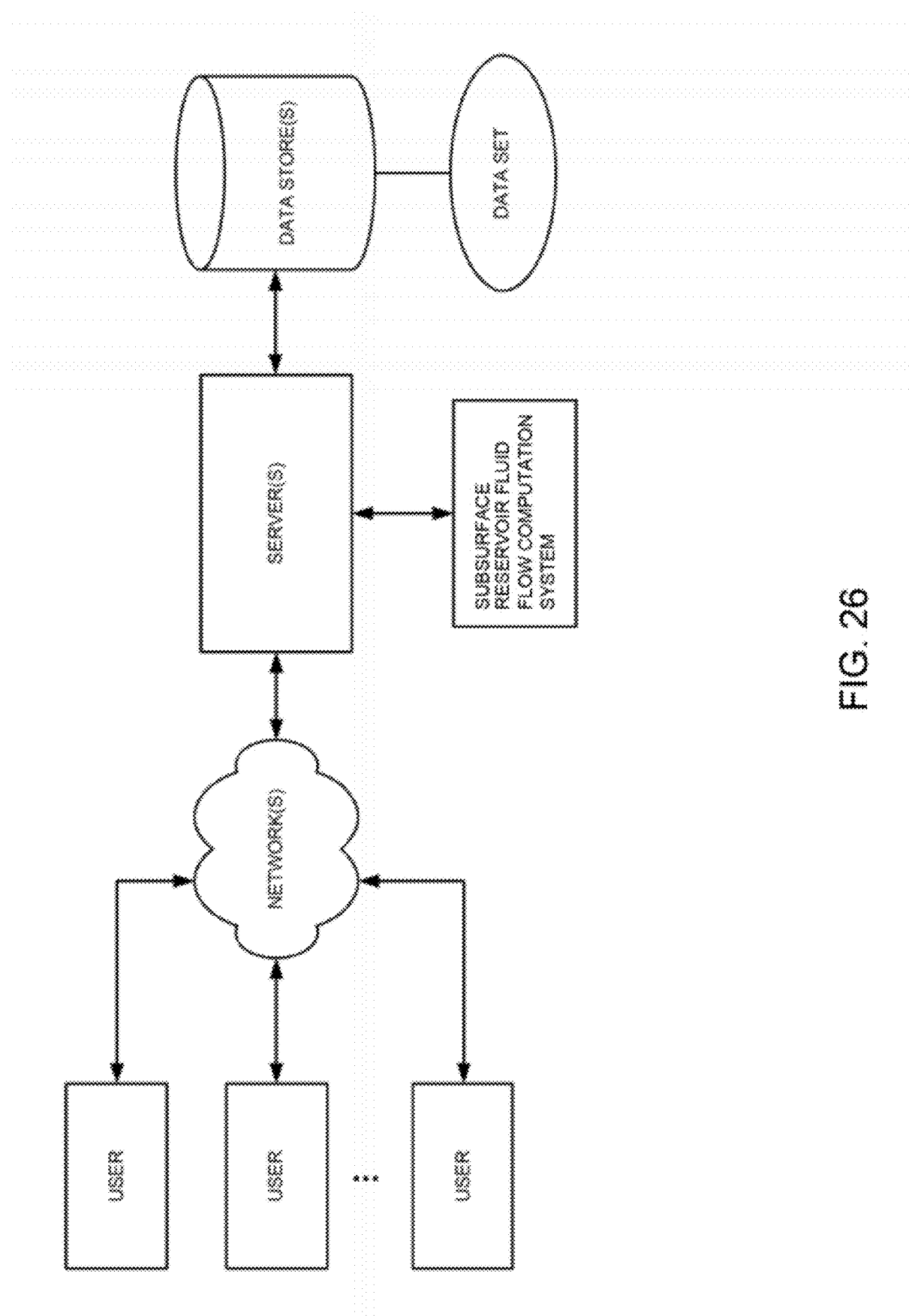
FIG. 26 illustrates an example computer system for use in implementing the methods.

It is further noted that the systems and methods may be implemented on various types of computer architectures, such as for example on a single general purpose computer or workstation, or on a networked system, or in a client-server configuration, or in an application service provider configuration. An exemplary computer system suitable for implementing the methods disclosed herein is illustrated in FIG. 26. As shown in FIG. 26, the computer system to implement one or more methods and systems disclosed herein can be linked to a network link which can be, e.g., part of a local area network to other, local computer systems and/or part of a wide area network, such as the Internet, that is connected to other, remote computer systems. For example, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. As an illustration, a computer can be programmed with instructions to perform the various steps of the flowcharts shown in FIGS. 4 and 5, and various steps of the processes of the block diagram shown in FIG. 1.

It is further noted that the systems and methods may include data signals conveyed via networks (e.g., local area network, wide area network, internet, combinations thereof), fiber optic medium, carrier waves, wireless networks, and combinations thereof for communication with one or more data processing devices. The data signals can carry any or all of the data disclosed herein that is provided to or from a device.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs). It is noted that data structures describe formats for use in organizing and storing data in databases, programs, memory, or other computer-readable media for use by a computer program. As an illustration, a system and method can be configured with one or more data structures resident in a memory for storing data representing a fine grid, a coarse grid, a dual coarse grid, and dual basis functions calculated on the dual coarse control volumes by solving local elliptic problems. Software instructions (executing on one or more data processors) can access the data stored in the data structure for generating the results described herein).

An embodiment of the present disclosure provides a computer-readable medium storing a computer program executable by a computer for performing the steps of any of the methods disclosed herein. A computer program product can be provided for use in conjunction with a computer having one or more memory units and one or more processor units, the computer program product including a computer readable storage medium having a computer program mechanism encoded thereon, wherein the computer program mechanism can be loaded into the one or more memory units of the computer and cause the one or more processor units of the computer to execute various steps illustrated in the flow chart of FIGS. 4 and 5, and various steps of the processes of the block diagram shown in FIG. 1.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise.

What is claimed is:

1. An iterative multi-scale computer-implemented method for use in simulating fluid flow in a subsurface reservoir, the method comprising:

executing on one or more data processors:

creating a fine grid defining a plurality of fine cells associated with a geological formation of the subsurface reservoir, a coarse grid defining a plurality of coarse cells having interfaces between the coarse cells, the coarse cells being boundaries aggregates of the fine cells such that each coarse cell contains a fine cell that defines a coarse node, and a dual coarse grid defining a plurality of dual coarse control volumes, the dual coarse control volumes being aggregates of the fine cells and having boundaries bounding the dual coarse control volumes;

calculating basis functions on the dual coarse control volumes by solving local elliptic problems;

calculating correction functions on the dual coarse control volumes by solving the local elliptic problems with fine grid source terms;

solving pressure values at the coarse nodes that account for fluxes induced by the correction functions;

interpolating the pressure values at the coarse nodes into the fine cells using the basis functions and the correction functions to obtain an interpolated fine grid pressure; and updating the interpolated fine grid pressure using an iterative multi-scale method comprising, for each iteration:
(i) applying a smoothing scheme to the fine grid pressure;
(ii) using the fine grid pressure that has been smoothed in step (i) to recalculate the correction functions;
(iii) applying a restriction operation comprising using the recalculated correction functions from step (ii) to solve for the pressure over the coarse grid; and
(iv) applying a prolongation operation to the pressure solved over the coarse grid from step (iii) to reconstruct an updated solution for the fine grid pressure;

wherein the pressure calculated using the iterative multi-scale method is used to simulate fluid flow in the subsurface reservoir.

2. The method of claim 1, wherein the pressure calculated using the iterative multi-scale method is a conservative solution at each iteration.

3. The method of claim 1, further comprising outputting or displaying the pressure calculated using the iterative multi-scale method.

4. The method of claim 1, wherein the calculating the pressure using the iterative multi-scale method is performed for at least one timestep in a plurality of timesteps.

5. The method of claim 1, wherein interpolating the pressure at the coarse nodes into the fine cells using the basis functions and the correction functions to obtain the interpolated fine grid pressure comprises weighting the basis functions by the pressure at the coarse nodes.

6. The method of claim 1, further comprising, prior to calculating the pressure using the iterative multi-scale method, a step of initializing the value for the pressure in the fine cells by setting the value equal to zero.

7. The method of claim 1, wherein the iterative multi-scale method is performed for a plurality of timesteps when the fine grid pressure that has been smoothed in step (i) changes from the previous timestep by a predetermined threshold value.

8. The method of claim 1, wherein the step of applying the smoothing scheme to the fine grid pressure comprises applying a line-relaxation smoothing operation, the line-relaxation smoothing operation comprising:
applying a linear operator that has a tri-diagonal structure to the solution of the fine grid pressure to provide a linear system of equations; and
solving the linear system of equations using a Thomas algorithm.

9. The method of claim 1, wherein the prolongation operation comprises the correction functions superimposed with basis functions that have been weighted with the values for the pressure obtained from step (iii).

10. The method of claim 1, wherein the steps (i) to (iv) are used as a linear solver.

11. The method of claim 1, wherein solving the pressure values at the coarse nodes that account for fluxes induced by the correction function comprises integrating the basis functions and the correction functions over each coarse cell.

12. The method of claim 1, wherein the correction functions recalculated in step (ii) are subject to local boundary conditions that are updated only at predetermined time steps.

13. The method of claim 1, wherein the convergence rate of the iterative multi-scale method is independent of problem size.

14. A method for operating a subsurface reservoir to achieve improved production of a reservoir fluid from a geological formation of the subsurface reservoir, comprising:
injecting a displacement fluid into a portion of the geological formation of the subsurface reservoir; and
applying a reservoir fluid production process to the subsurface reservoir under at least one operational condition that is derived based on the pressure calculated using the iterative multi-scale method from claim 1.

15. The method of claim 14, wherein the at least one operational condition is displacement fluid injection rate, reservoir fluid production rate, viscosity ratio of displacement fluid to reservoir fluid, location of injection of the displacement fluid, location of production of the reservoir fluid, displacement fluid saturations, reservoir fluid saturations, displacement fluid saturations at different pore volumes injected, or reservoir fluid saturations at different pore volumes injected.

16. A computer-implemented method for use in simulating fluid flow in a subsurface reservoir using a model, the method comprising:
executing on one or more data processors:
creating a fine grid defining a plurality of fine cells associated with a geological formation of the subsurface reservoir, a coarse grid defining a plurality of coarse cells having interfaces between the coarse cells, the coarse cells being aggregates of the fine cells, and a dual coarse grid defining a plurality of dual coarse control volumes, the dual coarse control volumes being aggregates of the fine cells and having boundaries bounding the dual coarse control volumes;
computing the model using a finite volume method, on a computer system, in a plurality of timesteps; wherein:
the model comprises one or more variables representative of fluid flow in the subsurface reservoir, wherein at least one of the one or more variables representative of fluid flow is responsive to calculated basis functions;
the computing comprises:
calculating the basis functions on the dual coarse control volumes by solving local elliptic problems;
calculating correction functions on the dual coarse control volumes by solving the local elliptic problems with fine grid source terms;
integrating the basis functions over each coarse cell to solve for pressure values at coarse nodes;
interpolating the pressure values at the coarse nodes into the fine cells using the basis functions and the correction functions to obtain an interpolated fine grid pressure; and for at least one timestep of the plurality of timesteps, updating the fine grid pressure using an iterative multi-scale method, the iterative multi-scale method comprising, for each iteration:
(i) applying a smoothing scheme to the fine grid pressure;
(ii) using the fine grid pressure that has been smoothed in step (i) to recalculate the correction functions;
(iii) solving for the pressure on the coarse grid using the correction functions from step (ii) wherein the solving comprises:
calculating the right-hand side of the linear system for the pressure over the coarse grid using the correction functions from step (ii); and
solving for the pressure on the coarse grid using the calculated right-hand side of the linear system for the pressure over the coarse grid; and
(iv) reconstructing a solution for the pressure over the fine grid using the result from step (iv); and
results from the computed model, comprising the pressure calculated using the iterative multi-scale method in the at least one timestep, simulate fluid flow in the subsurface reservoir.

17. The method of claim 16, wherein the smoothing scheme of step (i) comprises applying $n_s$ smoothing steps, where $n_s$ is a positive integer greater than 1.

18. The method of claim 16, wherein the pressure calculated using the iterative multi-scale method is a conservative solution at each iteration.

19. The method of claim 16, further comprising outputting or displaying the computed model comprising the pressure calculated using the iterative multi-scale method in the at least one timestep.

20. The method of claim 16, further comprising re-computing the correction functions in a timestep where the source term exceeds a predetermined limit.

21. The method of claim 16, wherein the step of applying the smoothing scheme to the fine grid pressure comprises applying a line-relaxation smoothing operation, the line-relaxation smoothing operation comprising:
applying a linear operator that has a tri-diagonal structure to the solution of the fine grid pressure to provide a linear system of equations; and
solving the linear system of equations using a Thomas algorithm.

22. A computer-implemented system for use in simulating fluid flow in a geological formation of a subsurface reservoir using a model, the system comprising:
a memory comprising one or more data structures for storing data representing a fine grid defining a plurality of fine cells, a coarse grid defining a plurality of coarse cells, a dual coarse grid defining a plurality of dual coarse control volumes, and dual basis functions calculated on the dual coarse control volumes by solving local elliptic problems; and
one or more data processors for executing software instructions to compute the model using a finite volume method in at least two timesteps; wherein:
the model comprises one or more variables representative of fluid flow in the subsurface reservoir, wherein at least one of the one or more variables representative of fluid flow is responsive to calculated basis functions;
the computing comprises:
calculating the basis functions on the dual coarse control volumes by solving local elliptic problems;
calculating correction functions on the dual coarse control volumes by solving the local elliptic problems with fine grid source terms;
integrating the basis functions over each coarse cell to solve for pressure values at coarse nodes;
interpolating the pressure values at the coarse nodes into the fine cells using the basis functions and the correction functions to obtain an interpolated fine grid pressure; and
for at least one timestep of the at least two timesteps, updating the fine grid pressure using an iterative multi-scale method, the iterative multi-scale method comprising, for each iteration:
(i) applying a smoothing scheme to the fine grid pressure;
(ii) using the fine grid pressure that has been smoothed in step (i) to recalculate the correction functions;
(iii) solving for the pressure on the coarse grid using the correction functions from step (ii) wherein the solving comprises:
calculating the right-hand side of the linear system for the pressure over the coarse grid using the correction functions from step (ii); and
solving for the pressure on the coarse grid using the calculated right-hand side of the linear system for the pressure over the coarse grid; and
(iv) reconstructing a solution for the pressure over the fine grid using the result from step (iii); and
a visual display for displaying fluid flow in the geological formation of the subsurface reservoir using the computed model, comprising the pressure calculated using the iterative multi-scale method in the at least two timesteps.

* * * * *